United States Patent
Adam, Jr. et al.

(10) Patent No.: US 11,813,822 B2
(45) Date of Patent: *Nov. 14, 2023

(54) COMPOSITE FILM

(71) Applicant: SAINT-GOBAIN PERFORMANCE PLASTICS CORPORATION, Solon, OH (US)

(72) Inventors: Arthur L. Adam, Jr., North Grosvenordale, CT (US); Fei Wang, Winchester, MA (US); Alessandro Barile, Milan (IT); Jia Liu, Shrewsbury, MA (US); Chuanping Li, Shrewsbury, MA (US); Nicholas David Orf, Natick, MA (US); Rachel Brown, Shrewsbury, MA (US); Dino Manfredi, Lummen (BE)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/048,506

(22) Filed: Oct. 21, 2022

(65) Prior Publication Data

US 2023/0113745 A1    Apr. 13, 2023

Related U.S. Application Data

(62) Division of application No. 17/227,995, filed on Apr. 12, 2021, now Pat. No. 11,511,527.

(Continued)

(51) Int. Cl.
  *B32B 27/34*    (2006.01)
  *B32B 27/06*    (2006.01)
(Continued)

(52) U.S. Cl.
  CPC .......... *B32B 27/065* (2013.01); *B32B 27/281* (2013.01); *B32B 27/34* (2013.01);
  (Continued)

(58) Field of Classification Search
  CPC ..... B32B 27/065; B32B 27/281; B32B 27/34; B32B 2457/10; H01M 50/229; H01M 50/231
  See application file for complete search history.

(56) References Cited

U.S. PATENT DOCUMENTS 4,124,732 A    11/1978  Leger
4,153,747 A    5/1979   Young et al.
(Continued)

FOREIGN PATENT DOCUMENTS

CN    103642413 A    3/2014
CN    203617293 U    5/2014
(Continued)

OTHER PUBLICATIONS

Hamdani et al., "Flame retardancy of silicone-based materials", Polymer Degradation and Stability, 2009, vol. 94, No. 4, pp. 465-495.
(Continued)

*Primary Examiner* — Lawrence D Ferguson
(74) *Attorney, Agent, or Firm* — Abel Schillinger, LLP; Chi Suk Kim

(57) ABSTRACT

The present disclosure relates to a multilayer composite that may include a first porous layer, and a first barrier layer overlying the first porous layer. The first barrier layer may include a polyaramid material, a polyimide material, or any combination thereof. The multilayer composite may have a flame resistance rating of at least about 180° C. and a 50% strain compression rating of not greater than about 600 kPa.

18 Claims, 6 Drawing Sheets

Related U.S. Application Data

(60) Provisional application No. 63/009,858, filed on Apr. 14, 2020.

(51) Int. Cl.
  *B32B 27/28* (2006.01)
  *H01M 50/229* (2021.01)
  *H01M 50/231* (2021.01)

(52) U.S. Cl.
  CPC ....... *H01M 50/229* (2021.01); *H01M 50/231* (2021.01); *B32B 2250/02* (2013.01); *B32B 2264/107* (2013.01); *B32B 2266/0214* (2013.01); *B32B 2307/3065* (2013.01); *B32B 2307/72* (2013.01); *B32B 2457/10* (2013.01)

(56) References Cited

U.S. PATENT DOCUMENTS

| | | |
|---|---|---|
| 4,728,567 A | 3/1988 | Razzano et al. |
| 4,994,317 A | 2/1991 | Dugan et al. |
| 5,156,360 A | 10/1992 | Shine |
| 6,049,906 A | 4/2000 | Aldridge |
| 7,503,664 B2 | 3/2009 | Moreau |
| 7,637,630 B2 | 12/2009 | Wilcox et al. |
| 7,749,387 B2 | 7/2010 | Sabottke et al. |
| 8,331,821 B2 | 12/2012 | Nakayama |
| 8,541,126 B2 | 9/2013 | Hermann et al. |
| 8,765,245 B2 | 7/2014 | Llano |
| 8,794,826 B2 | 8/2014 | Tracy |
| 8,889,574 B2 | 11/2014 | Dolgopolsky et al. |
| 9,646,774 B2 | 5/2017 | Waterford et al. |
| 9,978,895 B2 | 5/2018 | Anderson et al. |
| 10,116,016 B2 | 10/2018 | Mott et al. |
| 10,279,931 B2 | 5/2019 | Brewer et al. |
| 10,347,874 B2 | 7/2019 | Yamamoto et al. |
| 10,392,743 B2 | 8/2019 | Blackwood et al. |
| 11,511,527 B2 * | 11/2022 | Adam, Jr ................. B32B 7/12 |
| 2007/0238008 A1 | 10/2007 | Hogan et al. |
| 2010/0304152 A1 | 12/2010 | Clarke |
| 2012/0006685 A1 | 1/2012 | Van Engelen |
| 2015/0068691 A1 | 3/2015 | Thomas et al. |
| 2015/0247282 A1 | 9/2015 | Veiga et al. |
| 2019/0153286 A1 | 5/2019 | Peterson et al. |
| 2021/0316537 A1 | 10/2021 | Adam, Jr. et al. |

FOREIGN PATENT DOCUMENTS

| | | |
|---|---|---|
| CN | 103996729 B | 8/2016 |
| CN | 109638445 A | 4/2019 |
| DE | 2926145 A1 | 1/1980 |
| EP | 1102336 A1 | 5/2001 |
| IN | 283648 B | 5/2012 |
| IN | 201731044460 A | 6/2019 |
| JP | 2003170300 A | 6/2003 |
| KR | 101984203 B1 | 5/2019 |
| WO | 1993019984 A1 | 10/1993 |
| WO | 1994015557 A2 | 7/1994 |
| WO | 2006079697 A1 | 8/2006 |
| WO | 2018215870 A1 | 11/2018 |
| WO | 2019111816 A1 | 6/2019 |
| WO | 2019126681 A1 | 6/2019 |
| WO | 2019136302 A2 | 7/2019 |
| WO | 2021211428 A1 | 10/2021 |

OTHER PUBLICATIONS

International Search Report and Written Opinion for PCT Application No. PCT/US2021/026834, dated Jul. 30, 2021, 9 pages.

* cited by examiner

COMPOSITE FILM

CROSS-REFERENCE TO RELATED APPLICATION(S)

This Application is a divisional of and claims priority under 35 U.S.C. § 120 to U.S. patent application Ser. No. 17/227,995, entitled "COMPOSITE FILM," by Arthur L. ADAM, Jr. et al., filed Apr. 12, 2021, which claims priority under 35 U.S.C. § 119(e) to U.S. Provisional Application No. 63/009,858, entitled "COMPOSITE FILM," by Arthur L. ADAM, Jr. et al., filed Apr. 14, 2020, both of which are assigned to the current assignee hereof and are incorporated herein by reference in their entireties.

FIELD OF THE DISCLOSURE

The present disclosure relates to a multilayer composite and, in particular, a multilayer composite for use as a thermal barrier in various applications, for example, in a battery pack.

BACKGROUND

Multilayer composite films may be designed for high temperature protection in various applications, for example, for use as thermal barriers in electric vehicle battery packs, thermal barrier coverings in high temperature cable protection, thermal barrier containers for thermal spray containment, etc. However in these, and in other applications, potential heat growth continues to increase due to improvements in technology. Accordingly, there is a continuing need for improved barrier designs that protect against such high heat potential.

SUMMARY

According to a first aspect, a multilayer composite may include a first porous layer, and a first barrier layer overlying a surface of the first porous layer. The first barrier layer may include a polyaramid material, a polyimide material, or any combination thereof. The multilayer composite may have a flame resistance rating of not greater than about 180° C. and a 50% strain compression rating of not greater than about 600 kPa.

According to another aspect, a battery pack thermal barrier may include a multilayer composite that may include a first porous layer, and a first barrier layer overlying a surface of the first porous layer. The first barrier layer may include a polyaramid material, a polyimide material, or any combination thereof. The thermal barrier material may have a flame resistance rating of not greater than about 180° C. and a 50% strain compression rating of not greater than about 600 kPa.

BRIEF DESCRIPTION OF THE DRAWINGS

Embodiments are illustrated by way of example and are not limited to the accompanying figures.

Skilled artisans appreciate that elements in the figures are illustrated for simplicity and clarity and have not necessarily been drawn to scale.

DETAILED DESCRIPTION

The following discussion will focus on specific implementations and embodiments of the teachings. The detailed description is provided to assist in describing certain embodiments and should not be interpreted as a limitation on the scope or applicability of the disclosure or teachings. It will be appreciated that other embodiments can be used based on the disclosure and teachings as provided herein.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Multilayer Composite

Embodiments described herein are generally directed to a multilayer composite that may include a first porous layer and a first barrier layer overlying the first porous layer. According to certain embodiments, the first barrier layer may include a polyaramid material, a polyimide material, or any combination thereof. According to still other embodiments, the multilayer composite may demonstrate a combination of improved performance in flame resistance and compression. For example, and according to certain embodiments, the multilayer composite may have a flame resistance rating of not greater than about 180° C. According to still other embodiments, the multilayer composite may have a 50% strain compression rating of not greater than about 600 kPa.

Figure 1:
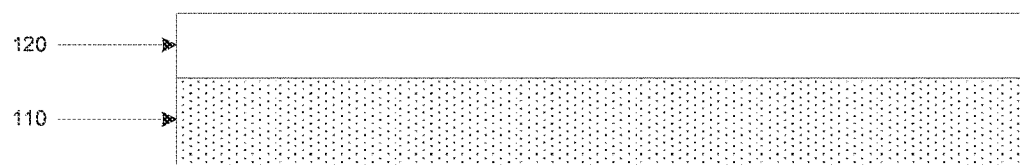
FIG. 1 includes an illustration of an example multilayer composite according to certain embodiments described herein.

For purposes of illustration, FIG. 1 shows a multilayer composite 100 according to embodiments described herein.

As shown in FIG. 1, a multilayer composite 100 may include a first porous layer 110 and a first barrier layer 120 overlying the first porous layer 110.

According to certain embodiments, the multilayer composite 100 may have a particular flame resistance rating. For purposes of embodiments described herein, the flame resistance rating of any layer or any multilayer composite may be defined as the maximum temperature reached on the unheated side of the multilayer composite tested using a convection flame test.

For purposes of embodiments described herein, the flame convection test used to measure the flame resistance rating of any layer or any multilayer composite follows the following procedure. First, attach test sample to room temperature (less than 30° C.) aluminum block using a small amount of polyimide tape. Apply the tape at corners of test sample and aluminum block, using only enough tape to secure the sample to the block and such that it does not interfere with the test. Next, cool the sample-aluminum-block test assembly to less than 26° C. before beginning a test. Cooling can be accelerated using a fan to blow air over the assembly. Ignite and heat flame to 625° C. Once flame temperature reaches 650° C., gently but quickly place the sample assembly on a test frame that brings one side of the sample into the flame. Monitor the temperature of the side of the sample-aluminum-block test assembly opposite the flame (i.e., the cold-side) and record the temperature after 90 seconds have elapsed.

According to certain embodiments, the multilayer composite 100 may have a flame resistance rating of not greater than about 180° C., such as, not greater than about 175° C. or not greater than about 170° C. or not greater than about 165° C. or not greater than about 160° C. or not greater than about 155° C. or not greater than about 150° C. or not greater than about 145° C. or not greater than about 140° C. or not greater than about 135° C. or not greater than about 130° C. or not greater than about 125° C. or even not greater than about 120° C. It will be appreciated that the flame resistance rating of the multilayer composite 100 may be within a range between any of the values noted above. It will be further appreciated that the flame resistance rating of the multilayer composite 100 may be any value between any of the minimum and maximum values noted above.

According to yet other embodiments, the multilayer composite 100 may have a particular 50% strain compression rating. For purposes of embodiments described herein, the 50% strain compression rating is defined as the compression rating of a sample measure at a 50% strain and is determined by measuring the force-to-compress and compression-force-deflection of the sample at a 50% strain. Force-to-compress (FTC) is defined as the peak force (or stress) to compress the sample to a predetermined strain and compression-force-deflection (CFD) is defined as the plateau or relaxation force (or stress) retained by a sample when held at the desired strain (i.e., 50%). Measurements are made using a Texture Analyzer which finds and records both FTC values and CFD values after a hold time of 60 seconds, a compression speed of 0.16 mm/s and a trigger force of 10 grams.

According to certain embodiments, the multilayer composite 100 may have a 50% strain compression rating of not greater than about 600 kPa, such as, not greater than about 575 kPa or not greater than about 550 kPa or not greater than about 525 kPa or not greater than about 500 kPa or not greater than about 475 kPa or not greater than about 450 kPa or not greater than about 425 kPa or not greater than about 400 kPa or not greater than about 375 kPa or not greater than about 350 kPa or not greater than about 325 kPa or not greater than about 300 kPa or not greater than about 275 kPa or not greater than about 250 kPa or not greater than about 225 kPa or not greater than about 200 kPa. It will be appreciated that the 50% strain compression rating of the multilayer composite 100 may be within a range between any of the values noted above. It will be further appreciated that the 50% strain compression rating of the multilayer composite 100 may be any value between any of the minimum and maximum values noted above.

According to yet other embodiments, the multilayer composite 100 may have a particular density. For purpose of embodiments described herein, the density of any layer or any multilayer composite 100 may be determined according to ASTM D1056. According to certain embodiments, the multilayer composite 100 may have a density of not greater than about 560 kg/m$^3$, such as, not great than about 540 kg/m$^3$ or not greater than about 520 kg/m$^3$ or not greater than about 500 kg/m$^3$ or not greater than about 480 kg/m$^3$ or not greater than about 460 kg/m$^3$ or not greater than about 440 kg/m$^3$ or not greater than about 420 kg/m$^3$ or not greater than about 400 kg/m$^3$ or not greater than about 380 kg/m$^3$ or not greater than about 360 kg/m$^3$ or not greater than about 340 kg/m$^3$ or not greater than about 320 kg/m$^3$ or even not greater than about 300 kg/m$^3$. According to yet other embodiments, the multilayer composite 100 may have a density of at least about 140 kg/m$^3$, such as, at least about 160 kg/m$^3$ or at least about 180 kg/m$^3$ or at least about 200 kg/m$^3$ or at least about 220 kg/m$^3$ or at least about 240 kg/m$^3$ or at least about 260 kg/m$^3$ or even at least about 280 kg/m$^3$. It will be appreciated that the density of the multilayer composite 100 may be within a range between any of the minimum and maximum values noted above. It will be further appreciated that the density of the multilayer composite 100 may be any value between any of the minimum and maximum values noted above.

According to yet other embodiments, the first porous layer 110 may include particular materials. For example, the first porous layer 110 may include a silicon material.

According to yet other embodiments, the first porous layer 110 may include a particular content of silicon material. For example, the first porous layer 110 may include a silicon material content of at least about 30 wt. % for a total weight of the first porous layer 110, such as, at least about 35 wt. % or at least about 40 wt. % or at least about 45 wt. % or at least about 50 wt. % or at least about 55 wt. % or at least about 60 wt. % or at least about 70 wt. % or at least about 80 wt. % or at least about 90 wt. % or even at least about 95 wt. %. According to yet other embodiments, the first porous layer 110 may include a silicon material content of or not greater than about 99 wt. %, such as, not greater than about 98 wt. % or not greater than about 97 wt. % or even not greater than about 96 wt. %. It will be appreciated that the silicon material content of the first porous layer 110 may be within a range between any of the minimum and maximum values noted above. It will be further appreciated that the silicon material content of the first porous layer 110 may be any value between any of the minimum and maximum values noted above.

According to yet other embodiments, the first porous layer 110 may include particular filler materials. For example, the filler material of the first porous layer 110 may include mica, kaolin, alumina trihydrate (ATH, hydrated alumina), alumina monohydrate (boehmite), or any combination thereof. According to still other embodiments, the filler material of the first porous layer 110 may include metal hydroxides, such as, for example, magnesium hydroxide (MDH), metal hydroxides, or any combination thereof.

According to still other embodiments, the filler material of the first porous layer 110 may include silica, metal silicates, or any combination thereof. According to still other embodiments, the filler material of the first porous layer 110 may include carbonates, such as, for example, calcium carbonate, zinc borate, or any combination thereof. According to yet other embodiments, the filler material of the first porous layer 110 may include a metal oxide, such as, for example, aluminum oxide, zinc oxide, titanium dioxide, cerium oxide, iron oxide or any combination thereof.

According to still other embodiments, the first porous layer 110 may include a particular content of filler material. For example, the first porous layer 110 may include a filler material content of at least about 10 wt. % for a total weight of the first porous layer 110, such as, at least about 15 wt. % or at least about 20 wt. % or at least about 25 wt. % or at least about 30 wt. % or at least about 35 wt. % or at least about 40 wt. % or at least about 45 wt. % or at least about 50 wt. % or at least about 55 wt. % or at least about 60 wt. % or at least about 65 wt. % or at least about 70 wt. % or even at least about 75 wt. %. According to yet other embodiments, the first porous layer 110 may include a filler material content of or not greater than about 95 wt. %, such as, not greater than about 90 wt. % or not greater than about 85 wt. % or even not greater than about 80 wt. %. It will be appreciated that the silicon material content of the first porous layer 110 may be within a range between any of the minimum and maximum values noted above. It will be further appreciated that the silicon material content of the first porous layer 110 may be any value between any of the minimum and maximum values noted above.

According to particular embodiments, the first porous layer 110 may have a particular thickness. For example, the first porous layer 110 may have a thickness of at least about 1 mm, such as, at least about 1.3 mm or at least about 1.5 mm or at least about 1.7 mm or at least about 2.0 mm or at least about 2.3 mm or at least about 2.5 mm or at least about 2.7 mm or at least about 3.0 mm or at least about 3.3 mm or at least about 3.5 mm or at least about 3.7 mm or at least about 4.0 mm or at least about 4.3 mm or at least about 4.5 mm or at least about 4.7 mm or at least about 5.0 mm or at least about 5.3 mm or at least about 5.5 mm or at least about 5.7 mm or at least about 6.0 mm or at least about 6.3 mm or at least about 6.5 mm or even at least about 7.0 mm. According to still other embodiments, the first porous layer 110 may have a thickness of not greater than about 13 mm, such as, not greater than about 12.8 mm or not greater than about 12.5 mm or not greater than about 12.2 mm or not greater than about 12.0 mm or not greater than about 11.8 mm or not greater than about 11.5 mm or not greater than about 11.2 mm or not greater than about 11.0 mm or not greater than about 10.8 mm or not greater than about 10.5 mm or not greater than about 10.2 mm or not greater than about 10.0 mm or not greater than about 9.8 mm or not greater than about 9.5 mm or not greater than about 9.2 mm or not greater than about 9.0 mm or not greater than about 8.8 mm or not greater than about 8.5 mm or not greater than about 8.2 mm or even not greater than about 8.0 mm. It will be appreciated that the thickness of the first porous layer 110 may be within a range between any of the minimum and maximum values noted above. It will be further appreciated that the thickness of the first porous layer 110 may be any value between any of the minimum and maximum values noted above.

According to certain embodiments, the first barrier layer 110 may include a particular material. For example, the first barrier layer 110 may include a polyaramid material, a polyimide material, or as combination thereof. According to still other embodiments, the first barrier layer 110 may consist essentially of a particular material. For example, the first barrier layer 110 may consist essentially of a polyaramid material, a polyimide material, or as combination thereof.

According to yet other embodiments, the first barrier layer 120 may have a particular thickness. For example, the first barrier layer 120 may have a thickness of at least about 0.10 mm, such as, at least about 0.13 mm or at least about 0.15 mm or at least about 0.17 mm or at least about 0.20 mm or at least about 0.23 mm or at least about 0.25 mm or at least about 0.27 mm or at least about 0.30 mm or at least about 0.33 mm or even at least about 0.35 mm. According to still other embodiments, the first barrier layer 120 may have a thickness of not greater than about 0.55 mm, such as, not greater than about 0.52 mm or not greater than about 0.50 mm or not greater than about 0.48 mm or not greater than about 0.45 mm or not greater than about 0.42 mm or even not greater than about 0.40 mm. It will be appreciated that the thickness of the first barrier layer 120 may be within a range between any of the minimum and maximum values noted above. It will be further appreciated that the thickness of the first barrier layer 120 may be any value between any of the minimum and maximum values noted above.

According to yet other embodiments, the multilayer composite 100 may have a particular thickness. For example, the multilayer composite 100 may have a thickness of at least about 1.0 mm, such as, at least about 1.03 mm or at least about 1.05 mm or at least about 1.07 mm or at least about 1.10 mm or at least about 1.13 mm or at least about 1.15 mm or at least about 1.17 mm or at least about 1.20 mm or at least about 1.30 mm or at least about 1.40 mm or at least about 1.50 mm or at least about 2.0 mm or at least about 2.5 mm or at least about 3.0 mm or at least about 3.5 mm or at least about 4.0 mm or at least about 4.5 mm or at least about 5.0 mm or at least about 5.5 mm or even at least about 6.0 mm. According to yet other embodiments, the multilayer composite 100 may have a thickness of not greater than about 13 mm, such as, not greater than about 12.5 mm or not greater than about 12.0 mm or not greater than about 11.5 mm or not greater than about 11.0 mm or not greater than about 10.5 mm or not greater than about 10.0 mm or not greater than about 9 mm or not greater than about 8.5 mm or even not greater than about 8.0 mm. It will be appreciated that the thickness of the multilayer composite 100 may be within a range between any of the minimum and maximum values noted above. It will be further appreciated that the thickness of the multilayer composite 100 may be any value between any of the minimum and maximum values noted above.

According to still other embodiments, the multilayer composite 100 may have a particular thickness ratio PL1/BL1, where PL1 is equal to the thickness of the first porous layer and BL1 is equal to the thickness of the first barrier layer. For example, the multilayer composite 100 may have a thickness ratio PL1/BL1 of at least about 2.0, such as, at least about 5.0 or at least about 10 or at least about 15 or at least about 20 or at least about 25 or at least about 30 or at least about 35 or at least about 40 or at least about 45 or at least about 50 or at least about 55 or at least about 60 or at least about 65 or even at least about 70. According to still other embodiments, the multilayer composite 100 may have a thickness ratio PL1/BL1 of not greater than about 99, such as, not greater than about 95 or not greater than about 90 or not greater than about 85 or not greater than about 80 or even not greater than about 75. It will be appreciated that the thickness ratio PL1/BL1 of the multilayer composite 100 may be within a range between any of the minimum and maximum values noted above. It will be further appreciated that the thickness ratio PL1/BL1 of the multilayer composite 100 may be any value between any of the minimum and maximum values noted above.

According to yet other embodiments, the multilayer composite 100 may have a particular thickness ratio PL1/CF, where PL1 is equal to the thickness of the first porous layer and CF is equal to the thickness of the composite. For example, the multilayer composite 100 may have a thickness ratio PL1/CF of at least about 0.50, such as, at least about 0.52 or at least about 0.54 or at least about 0.56 or at least about 0.58 or at least about 0.60 or at least about 0.62 or at least about 0.64 or at least about 0.66 or at least about 0.68 or at least about 0.70 or at least about 0.72 or at least about 0.74 or at least about 0.76 or at least about 0.78 or even at least about 0.80. According to yet other embodiments, the multilayer composite 100 may have a thickness ratio PL1/CF of not greater than about 0.99 or not greater than about 0.96 or not greater than about 0.94 or not greater than about 0.92 or not greater than about 0.90 or not greater than about 0.88 or not greater than about 0.86 or not greater than about 0.84 or not greater than about 0.82 or even not greater than about 0.80. It will be appreciated that the thickness ratio PL1/CF of the multilayer composite 100 may be within a range between any of the minimum and maximum values noted above. It will be further appreciated that the thickness ratio PL1/CF of the multilayer composite 100 may be any value between any of the minimum and maximum values noted above.

According to yet other embodiments, the multilayer composite 100 may have a particular thickness ratio BL1/CF, where BL1 is equal to the thickness of the first barrier layer and CF is equal to the thickness of the composite. For example, the multilayer composite 100 may have a thickness ratio BL1/CF of at least about 0.01, such as, at least about 0.02 or at least about 0.04 or at least about 0.06 or at least about 0.08 or at least about 0.10 or at least about 0.12 or at least about 0.14 or at least about 0.16 or at least about 0.18 or at least about 0.20 or at least about 0.22 or at least about 0.24 or even at least about 0.26. According to yet other embodiments, the multilayer composite 100 may have a thickness ratio BL1/CF of not greater than about 0.4, such as, not greater than about 0.38 or not greater than about 0.36 or not greater than about 0.34 or not greater than about 0.32 or not greater than about 0.30 or even not greater than about 0.28. It will be appreciated that the thickness ratio BL1/CF of the multilayer composite 100 may be within a range between any of the minimum and maximum values noted above. It will be further appreciated that the thickness ratio BL1/CF of the multilayer composite 100 may be any value between any of the minimum and maximum values noted above.

Figure 2:
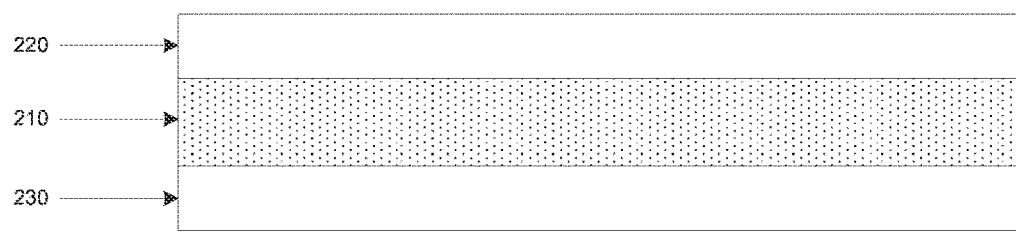
FIG. 2 includes an illustration of another example multilayer composite according to certain embodiments described herein.

FIG. 2 shows another multilayer composite 200 according to embodiments described herein. As shown in FIG. 2, the multilayer composite 200 may include a first porous layer 210, a first barrier layer 220 overlying the first porous layer 210, and a second barrier layer 230 underlying the first porous layer 210. As shown in FIG. 2, the first porous layer 210 may be located between the first barrier layer 220 and the second barrier layer 230.

It will be appreciated that the multilayer composite 200 and all components described in reference to the multilayer composite 200 as shown in FIG. 2 may have any of the characteristics described herein with reference to corresponding components in FIG. 1. In particular, the characteristics of the multilayer composite 200, the first porous layer 210, and the first barrier layer 220 shown in FIG. 2 may have any of the corresponding characteristics described herein in reference to multilayer composite 100, the first porous layer 110, and the first barrier layer 120 shown in FIG. 1, respectively.

According to yet other embodiments, the multilayer composite 200 may have a particular flame resistance rating. According to certain embodiments, the multilayer composite 200 may have a flame resistance rating of not greater than about 180° C., such as, not greater than about 175° C. or not greater than about 170° C. or not greater than about 165° C. or not greater than about 160° C. or not greater than about 155° C. or not greater than about 150° C. or not greater than about 145° C. or not greater than about 140° C. or not greater than about 135° C. or not greater than about 130° C. or not greater than about 125° C. or even not greater than about 120° C. It will be appreciated that the flame resistance rating of the multilayer composite 200 may be within a range between any of the values noted above. It will be further appreciated that the flame resistance rating of the multilayer composite 200 may be any value between any of the minimum and maximum values noted above.

According to yet other embodiments, the multilayer composite 200 may have a particular compression rating. According to certain embodiments, the multilayer composite 200 may have a 50% strain compression rating of not greater than about 600 kPa, such as, not greater than about 575 kPa or not greater than about 550 kPa or not greater than about 525 kPa or not greater than about 500 kPa or not greater than about 475 kPa or not greater than about 450 kPa or not greater than about 425 kPa or not greater than about 400 kPa or not greater than about 375 kPa or not greater than about 350 kPa or not greater than about 325 kPa or not greater than about 300 kPa or not greater than about 275 kPa or not greater than about 250 kPa or not greater than about 225 kPa or not greater than about 200 kPa. It will be appreciated that the 50% strain compression rating of the multilayer composite 200 may be within a range between any of the values noted above. It will be further appreciated that the 50% strain compression rating of the multilayer composite 200 may be any value between any of the minimum and maximum values noted above.

According to yet other embodiments, the multilayer composite 200 may have a particular density. According to certain embodiments, the multilayer composite 200 may have a density of not greater than about 560 kg/m$^3$, such as, not great than about 540 kg/m$^3$ or not greater than about 520 kg/m$^3$ or not greater than about 500 kg/m$^3$ or not greater than about 480 kg/m$^3$ or not greater than about 460 kg/m$^3$ or not greater than about 440 kg/m$^3$ or not greater than about 420 kg/m$^3$ or not greater than about 400 kg/m$^3$ or not greater than about 380 kg/m$^3$ or not greater than about 360 kg/m$^3$ or not greater than about 340 kg/m$^3$ or not greater than about 320 kg/m$^3$ or even not greater than about 300 kg/m$^3$. According to yet other embodiments, the multilayer composite 200 may have a density of at least about 140 kg/m$^3$, such as, at least about 160 kg/m$^3$ or at least about 180 kg/m$^3$ or at least about 200 kg/m$^3$ or at least about 220 kg/m$^3$ or at least about 240 kg/m$^3$ or at least about 260 kg/m$^3$ or even at least about 280 kg/m$^3$. It will be appreciated that the density of the multilayer composite 200 may be within a range between any of the minimum and maximum values noted above. It will be further appreciated that the density of the multilayer composite 200 may be any value between any of the minimum and maximum values noted above.

According to certain embodiments, the second barrier layer 230 may include a particular material. For example, the second barrier layer 230 may include a polyaramid material, a polyimide material, or as combination thereof. According to still other embodiments, the second barrier layer 230 may consist essentially of a particular material. For example, the second barrier layer 230 may consist essentially of a polyaramid material, a polyimide material, or as combination thereof.

According to yet other embodiments, the second barrier layer 230 may have a particular thickness. For example, the second barrier layer 230 may have a thickness of at least about 0.10 mm, such as, at least about 0.13 mm or at least about 0.15 mm or at least about 0.17 mm or at least about 0.20 mm or at least about 0.23 mm or at least about 0.25 mm or at least about 0.27 mm or at least about 0.30 mm or at least about 0.33 mm or even at least about 0.35 mm. According to still other embodiments, the second barrier layer 230 may have a thickness of not greater than about 0.55 mm, such as, not greater than about 0.52 mm or not greater than about 0.50 mm or not greater than about 0.48 mm or not greater than about 0.45 mm or not greater than about 0.42 mm or even not greater than about 0.40 mm. It will be appreciated that the thickness of the second barrier layer 230 may be within a range between any of the minimum and maximum values noted above. It will be further appreciated that the thickness of the second barrier layer 230 may be any value between any of the minimum and maximum values noted above.

According to still other embodiments, the multilayer composite 200 may have a particular thickness ratio PL1/BL2, where PL1 is equal to the thickness of the first porous layer and BL2 is equal to the thickness of the second barrier layer. For example, the multilayer composite 200 may have a thickness ratio PL1/BL2 of at least about 2.0, such as, at least about 5.0 or at least about 10 or at least about 15 or at least about 20 or at least about 25 or at least about 30 or at least about 35 or at least about 40 or at least about 45 or at least about 50 or at least about 55 or at least about 60 or at least about 65 or even at least about 70. According to still other embodiments, the multilayer composite 200 may have a thickness ratio PL1/BL2 of not greater than about 99, such as, not greater than about 95 or not greater than about 90 or not greater than about 85 or not greater than about 80 or not greater than about 75. It will be appreciated that the thickness ratio PL1/BL2 of the multilayer composite 200 may be within a range between any of the minimum and maximum values noted above. It will be further appreciated that the thickness ratio PL1/BL2 of the multilayer composite 200 may be any value between any of the minimum and maximum values noted above.

According to yet other embodiments, the multilayer composite 200 may have a particular thickness ratio BL2/CF, where BL2 is equal to the thickness of the second barrier layer and CF is equal to the thickness of the composite. For example, the multilayer composite 200 may have a thickness ratio BL2/CF of at least about 0.01, such as, at least about 0.02 or at least about 0.04 or at least about 0.06 or at least about 0.08 or at least about 0.10 or at least about 0.12 or at least about 0.14 or at least about 0.16 or at least about 0.18 or at least about 0.20 or at least about 0.22 or at least about 0.24 or even at least about 0.26. According to yet other embodiments, the multilayer composite 200 may have a thickness ratio BL2/CF of not greater than about 0.4, such as, not greater than about 0.38 or not greater than about 0.36 or not greater than about 0.34 or not greater than about 0.32 or not greater than about 0.30 or even not greater than about 0.28. It will be appreciated that the thickness ratio BL2/CF of the multilayer composite 200 may be within a range between any of the minimum and maximum values noted above. It will be further appreciated that the thickness ratio BL2/CF of the multilayer composite 200 may be any value between any of the minimum and maximum values noted above.

Figure 3:
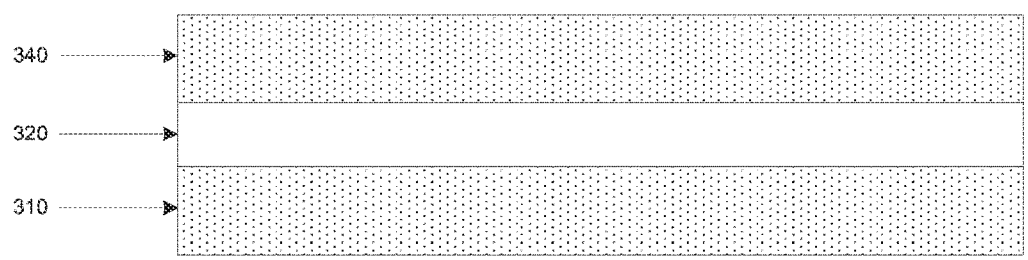
FIG. 3 includes an illustration of another example multilayer composite according to certain embodiments described herein.

FIG. 3 shows another multilayer composite 300 according to embodiments described herein. As shown in FIG. 3, the multilayer composite 300 may include a first porous layer 310, a first barrier layer 320 overlying the first porous layer 310, and a second porous layer 340 overlying the first barrier layer 320. As shown in FIG. 3, the first barrier layer 320 may be located between the first porous layer 310 and the second porous layer 340.

It will be appreciated that the multilayer composite 300 and all components described in reference to the multilayer composite 300 as shown in FIG. 3 may have any of the characteristics described herein with reference to corresponding components in FIG. 1 and/or FIG. 2. In particular, the characteristics of the multilayer composite 300, the first porous layer 310, and the first barrier layer 320 shown in FIG. 3 may have any of the corresponding characteristics described herein in reference to multilayer composite 100 (200), the first porous layer 110 (210), and the first barrier layer 120 (220) shown in FIG. 1 (FIG. 2), respectively.

According to yet other embodiments, the multilayer composite 300 may have a particular flame resistance rating. According to certain embodiments, the multilayer composite 300 may have a flame resistance rating of not greater than about 180° C., such as, not greater than about 175° C. or not greater than about 170° C. or not greater than about 165° C. or not greater than about 160° C. or not greater than about 155° C. or not greater than about 150° C. or not greater than about 145° C. or not greater than about 140° C. or not greater than about 135° C. or not greater than about 130° C. or not greater than about 125° C. or even not greater than about 120° C. It will be appreciated that the flame resistance rating of the multilayer composite 300 may be within a range between any of the values noted above. It will be further appreciated that the flame resistance rating of the multilayer composite 300 may be any value between any of the minimum and maximum values noted above.

According to yet other embodiments, the multilayer composite 300 may have a particular 50% strain compression rating. According to certain embodiments, the multilayer composite 300 may have a 50% strain compression rating of not greater than about 600 kPa, such as, not greater than about 575 kPa or not greater than about 550 kPa or not greater than about 525 kPa or not greater than about 500 kPa or not greater than about 475 kPa or not greater than about 450 kPa or not greater than about 425 kPa or not greater than about 400 kPa or not greater than about 375 kPa or not greater than about 350 kPa or not greater than about 325 kPa or not greater than about 300 kPa or not greater than about 275 kPa or not greater than about 250 kPa or not greater than about 225 kPa or not greater than about 200 kPa. It will be appreciated that the 50% strain compression rating of the multilayer composite 300 may be within a range between any of the values noted above. It will be further appreciated that the 50% strain compression rating of the multilayer composite 300 may be any value between any of the minimum and maximum values noted above.

According to yet other embodiments, the multilayer composite 300 may have a particular density. According to certain embodiments, the multilayer composite 300 may have a density of not greater than about 560 kg/m$^3$, such as, not great than about 540 kg/m$^3$ or not greater than about 520 kg/m$^3$ or not greater than about 500 kg/m$^3$ or not greater than about 480 kg/m$^3$ or not greater than about 460 kg/m$^3$ or not greater than about 440 kg/m$^3$ or not greater than about 420 kg/m$^3$ or not greater than about 400 kg/m$^3$ or not greater than about 380 kg/m$^3$ or not greater than about 360 kg/m$^3$ or not greater than about 340 kg/m$^3$ or not greater than about 320 kg/m$^3$ or even not greater than about 300 kg/m$^3$. According to yet other embodiments, the multilayer composite 300 may have a density of at least about 140 kg/m$^3$, such as, at least about 160 kg/m$^3$ or at least about 180 kg/m$^3$ or at least about 200 kg/m$^3$ or at least about 220 kg/m$^3$ or at least about 240 kg/m$^3$ or at least about 260 kg/m$^3$ or even at least about 280 kg/m$^3$. It will be appreciated that the density of the multilayer composite 300 may be within a range between any of the minimum and maximum values noted above. It will be further appreciated that the density of the multilayer composite 300 may be any value between any of the minimum and maximum values noted above.

According to yet other embodiments, the second porous layer 340 may include particular materials. For example, the second porous layer 340 may include silicon material.

According to yet other embodiments, the second porous layer 340 may include a particular content of silicon material. For example, the second porous layer 340 may include a silicon material content of at least about 30 wt. % for a total weight of the second porous layer 340, such as, at least about 35 wt. % or at least about 40 wt. % or at least about 45 wt. % or at least about 50 wt. % or at least about 55 wt. % or at least about 60 wt. % or at least about 70 wt. % or at least about 80 wt. % or at least about 90 wt. % or even at least about 95 wt. %. According to yet other embodiments, the second porous layer 340 may include a silicon material content of or not greater than about 99 wt. %, such as, not greater than about 98 wt. % or not greater than about 97 wt. % or even not greater than about 96 wt. %. It will be appreciated that the silicon material content of the second porous layer 340 may be within a range between any of the minimum and maximum values noted above. It will be further appreciated that the silicon material content of the second porous layer 340 may be any value between any of the minimum and maximum values noted above.

According to yet other embodiments, the second porous layer 340 may include particular filler materials. For example, the filler material of the second porous layer 340 may include mica, kaolin, alumina trihydrate (ATH, hydrated alumina), alumina monohydrate (boehmite), or any combination thereof. According to still other embodiments, the filler material of the second porous layer 340 may include metal hydroxides, such as, for example, magnesium hydroxide (MDH), metal hydroxides, or any combination thereof. According to still other embodiments, the filler material of the second porous layer 340 may include silica, metal silicates, or any combination thereof. According to still other embodiments, the filler material of the second porous layer 340 may include carbonates, such as, for example, calcium carbonate, zinc borate, or any combination thereof. According to yet other embodiments, the filler material of the second porous layer 340 may include a metal oxide, such as, for example, aluminum oxide, zinc oxide, titanium dioxide, cerium oxide, iron oxide or any combination thereof.

According to still other embodiments, the second porous layer 340 may include a particular content of filler material. For example, the second porous layer 340 may include a filler material content of at least about 10 wt. % for a total weight of the second porous layer 340, such as, at least about 15 wt. % or at least about 20 wt. % or at least about 25 wt. % or at least about 30 wt. % or at least about 35 wt. % or at least about 40 wt. % or at least about 45 wt. % or at least about 50 wt. % or at least about 55 wt. % or at least about 60 wt. % or at least about 65 wt. % or at least about 70 wt. % or even at least about 75 wt. %. According to yet other embodiments, the second porous layer 340 may include a filler material content of or not greater than about 95 wt. %, such as, not greater than about 90 wt. % or not greater than about 85 wt. % or even not greater than about 80 wt. %. It will be appreciated that the silicon material content of the second porous layer 340 may be within a range between any of the minimum and maximum values noted above. It will be further appreciated that the silicon material content of the second porous layer 340 may be any value between any of the minimum and maximum values noted above.

According to particular embodiments, the second porous layer 340 may have a particular thickness. For example, the second porous layer 340 may have a thickness of at least about 1 mm, such as, at least about 1.3 mm or at least about 1.5 mm or at least about 1.7 mm or at least about 2.0 mm or at least about 2.3 mm or at least about 2.5 mm or at least about 2.7 mm or at least about 3.0 mm or at least about 3.3 mm or at least about 3.5 mm or at least about 3.7 mm or at least about 4.0 mm or at least about 4.3 mm or at least about 4.5 mm or at least about 4.7 mm or at least about 5.0 mm or at least about 5.3 mm or at least about 5.5 mm or at least about 5.7 mm or at least about 6.0 mm or at least about 6.3 mm or at least about 6.5 mm or even at least about 7.0 mm. According to still other embodiments, the second porous layer 340 may have a thickness of not greater than about 13 mm, such as, not greater than about 12.8 mm or not greater than about 12.5 mm or not greater than about 12.2 mm or not greater than about 12.0 mm or not greater than about 11.8 mm or not greater than about 11.5 mm or not greater than about 11.2 mm or not greater than about 11.0 mm or not greater than about 10.8 mm or not greater than about 10.5 mm or not greater than about 10.2 mm or not greater than about 10.0 mm or not greater than about 9.8 mm or not greater than about 9.5 mm or not greater than about 9.2 mm or not greater than about 9.0 mm or not greater than about 8.8 mm or not greater than about 8.5 mm or not greater than about 8.2 mm or even not greater than about 8.0 mm. It will be appreciated that the thickness of the second porous layer 340 may be within a range between any of the minimum and maximum values noted above. It will be further appreciated that the thickness of the second porous layer 340 may be any value between any of the minimum and maximum values noted above.

According to still other embodiments, the multilayer composite 300 may have a particular thickness ratio PL2/BL1, where PL2 is equal to the thickness of the first porous layer and BL1 is equal to the thickness of the first barrier layer. For example, the multilayer composite 300 may have a thickness ratio PL2/BL1 of at least about 2.0, such as, at least about 5.0 or at least about 10 or at least about 15 or at least about 20 or at least about 25 or at least about 30 or at least about 35 or at least about 40 or at least about 45 or at least about 50 or at least about 55 or at least about 60 or at least about 65 or even at least about 70. According to still other embodiments, the multilayer composite 300 may have a thickness ratio PL2/BL1 of not greater than about 99, such as, not greater than about 95 or not greater than about 90 or not greater than about 85 or not greater than about 80 or even not greater than about 75. It will be appreciated that the thickness ratio PL2/BL1 of the multilayer composite 300 may be within a range between any of the minimum and maximum values noted above. It will be further appreciated that the thickness ratio PL2/BL1 of the multilayer composite 300 may be any value between any of the minimum and maximum values noted above.

According to yet other embodiments, the multilayer composite 300 may have a particular thickness ratio PL2/CF, where PL2 is equal to the thickness of the first porous layer and CF is equal to the thickness of the composite. For example, the multilayer composite 300 may have a thickness ratio PL2/CF of at least about 0.35, such as, at least about 0.37 or at least about 0.39 or at least about 0.40 or at least about 0.45 or at least about 0.50 or at least about 0.55 or at least about 0.60 or at least about 0.65 or at least about 0.70 or at least about 0.75 or even at least about 0.80. According to yet other embodiments, the multilayer composite 300 may have a thickness ratio PL2/CF of not greater than about 0.99 or not greater than about 0.96 or not greater than about 0.94 or not greater than about 0.92 or not greater than about 0.90 or not greater than about 0.88 or not greater than about 0.86 or not greater than about 0.84 or not greater than about 0.82 or even not greater than about 0.80. It will be appreciated that the thickness ratio PL2/CF of the multilayer composite 300 may be within a range between any of the minimum and maximum values noted above. It will be further appreciated that the thickness ratio PL2/CF of the multilayer composite 300 may be any value between any of the minimum and maximum values noted above.

According to certain embodiments, the multilayer composite described herein may be formed according to any acceptable forming process for a multilayer composite. According to a particular embodiment, the multilayer composite may be formed using a lamination process where the porous foam and barrier layer are laminated using a transfer adhesive such as, for example, a silicon adhesive, a rubber adhesive, an acrylic adhesive, a phenolic adhesive, a polyurethane based adhesive or any combination thereof. According to still other embodiments, the multilayer composite may be formed using a lamination process with a porous foam and a coated barrier layer, where the coating on the barrier layer is an adhesive, such as, a silicon adhesive, a rubber adhesive, an acrylic adhesive, a phenolic adhesive, a polyurethane based adhesive or any combination thereof. According to still other embodiments, the multilayer composite may be formed using a direct cast forming process, wherein the foam is directly cast onto the barrier films or between the barrier films.

Thermal Barrier Composite

Tuning now to additional embodiments described herein, such embodiments are generally directed to a thermal barrier composite that may include a first porous layer and a first barrier layer overlying the first porous layer. According to certain embodiments, the barrier layer may include a polyaramid material, a polyimide material, or as combination thereof. According to still other embodiments, the thermal barrier composite may demonstrate a combination of improved performance in flame resistance and compression. For example, and according to certain embodiments, the thermal barrier composite may have a flame resistance rating of at least about 200° C. According to still other embodiments, the thermal barrier composite may have a compression rating of at least about 350 kPa at 50% strain.

Figure 4:
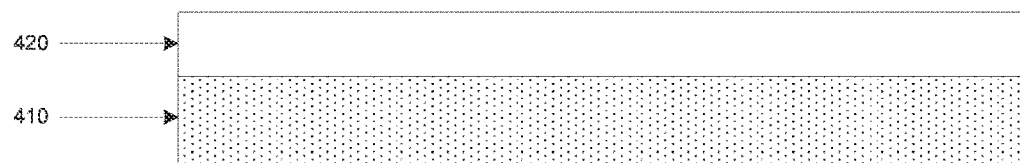
FIG. 4 includes an illustration of an example thermal barrier composite according to certain embodiments described herein.

For purposes of illustration, FIG. 4 shows a thermal barrier composite 400 according to embodiments described herein. As shown in FIG. 4, a thermal barrier composite 400 may include a first porous layer 410 and a first barrier layer 420 overlying the first porous layer 410.

According to yet other embodiments, the thermal barrier composite 400 may have a particular flame resistance rating. According to certain embodiments, the thermal barrier composite 400 may have a flame resistance rating of not greater than about 180° C., such as, not greater than about 175° C. or not greater than about 170° C. or not greater than about 165° C. or not greater than about 160° C. or not greater than about 155° C. or not greater than about 150° C. or not greater than about 145° C. or not greater than about 140° C. or not greater than about 135° C. or not greater than about 130° C. or not greater than about 125° C. or even not greater than about 120° C. It will be appreciated that the flame resistance rating of the thermal barrier composite 400 may be within a range between any of the values noted above. It will be further appreciated that the flame resistance rating of the thermal barrier composite 400 may be any value between any of the minimum and maximum values noted above.

According to yet other embodiments, the thermal barrier composite 400 may have a particular compression rating. According to certain embodiments, the thermal barrier composite 400 may have a 50% strain compression rating of not greater than about 600 kPa, such as, not greater than about 575 kPa or not greater than about 550 kPa or not greater than about 525 kPa or not greater than about 500 kPa or not greater than about 475 kPa or not greater than about 450 kPa or not greater than about 425 kPa or not greater than about 400 kPa or not greater than about 375 kPa or not greater than about 350 kPa or not greater than about 325 kPa or not greater than about 300 kPa or not greater than about 275 kPa or not greater than about 250 kPa or not greater than about 225 kPa or not greater than about 200 kPa. It will be appreciated that the 50% strain compression rating of the thermal barrier composite 400 may be within a range between any of the values noted above. It will be further appreciated that the 50% strain compression rating of the thermal barrier composite 400 may be any value between any of the minimum and maximum values noted above.

According to yet other embodiments, the thermal barrier composite 400 may have a particular density. According to certain embodiments, the thermal barrier composite 400 may have a density of not greater than about 560 kg/m$^3$, such as, not great than about 540 kg/m$^3$ or not greater than about 520 kg/m$^3$ or not greater than about 500 kg/m$^3$ or not greater than about 480 kg/m$^3$ or not greater than about 460 kg/m$^3$ or not greater than about 440 kg/m$^3$ or not greater than about 420 kg/m$^3$ or not greater than about 400 kg/m$^3$ or not greater than about 380 kg/m$^3$ or not greater than about 360 kg/m$^3$ or not greater than about 340 kg/m$^3$ or not greater than about 320 kg/m$^3$ or even not greater than about 300 kg/m$^3$. According to yet other embodiments, the thermal barrier composite 400 may have a density of at least about 140 kg/m$^3$, such as, at least about 160 kg/m$^3$ or at least about 180 kg/m$^3$ or at least about 200 kg/m$^3$ or at least about 220 kg/m$^3$ or at least about 240 kg/m$^3$ or at least about 260 kg/m$^3$ or even at least about 280 kg/m$^3$. It will be appreciated that the density of the thermal barrier composite 400 may be within a range between any of the minimum and maximum values noted above. It will be further appreciated that the density of the thermal barrier composite 400 may be any value between any of the minimum and maximum values noted above.

According to yet other embodiments, the first porous layer 410 may include particular materials. For example, the first porous layer 410 may include silicon material.

According to yet other embodiments, the first porous layer 410 may include a particular content of silicon material. For example, the first porous layer 410 may include a silicon material content of at least about 30 wt. % for a total weight of the first porous layer 410, such as, at least about 35 wt. % or at least about 40 wt. % or at least about 45 wt. % or at least about 50 wt. % or at least about 55 wt. % or at least about 60 wt. % or at least about 70 wt. % or at least about 80 wt. % or at least about 90 wt. % or even at least about 95 wt. %. According to yet other embodiments, the first porous layer 410 may include a silicon material content of or not greater than about 99 wt. %, such as, not greater than about 98 wt. % or not greater than about 97 wt. % or even not greater than about 96 wt. %. It will be appreciated that the silicon material content of the first porous layer 410 may be within a range between any of the minimum and maximum values noted above. It will be further appreciated that the silicon material content of the first porous layer 410 may be any value between any of the minimum and maximum values noted above.

According to yet other embodiments, the first porous layer 410 may include particular filler materials. For example, the filler material of the first porous layer 410 may include mica, kaolin, alumina trihydrate (ATH, hydrated alumina), alumina monohydrate (boehmite), or any combination thereof. According to still other embodiments, the filler material of the first porous layer 410 may include metal hydroxides, such as, for example, magnesium hydroxide (MDH), metal hydroxides, or any combination thereof. According to still other embodiments, the filler material of the first porous layer 410 may include silica, metal silicates, or any combination thereof. According to still other embodiments, the filler material of the first porous layer 410 may include carbonates, such as, for example, calcium carbonate, zinc borate, or any combination thereof. According to yet other embodiments, the filler material of the first porous layer 410 may include a metal oxide, such as, for example, aluminum oxide, zinc oxide, titanium dioxide, cerium oxide, iron oxide or any combination thereof.

According to still other embodiments, the first porous layer 410 may include a particular content of filler material. For example, the first porous layer 410 may include a filler material content of at least about 10 wt. % for a total weight of the first porous layer 410, such as, at least about 15 wt. % or at least about 20 wt. % or at least about 25 wt. % or at least about 30 wt. % or at least about 35 wt. % or at least about 40 wt. % or at least about 45 wt. % or at least about 50 wt. % or at least about 55 wt. % or at least about 60 wt. % or at least about 65 wt. % or at least about 70 wt. % or even at least about 75 wt. %. According to yet other embodiments, the first porous layer 410 may include a filler material content of or not greater than about 95 wt. %, such as, not greater than about 90 wt. % or not greater than about 85 wt. % or even not greater than about 80 wt. %. It will be appreciated that the silicon material content of the first porous layer 410 may be within a range between any of the minimum and maximum values noted above. It will be further appreciated that the silicon material content of the first porous layer 410 may be any value between any of the minimum and maximum values noted above.

According to particular embodiments, the first porous layer 410 may have a particular thickness. For example, the first porous layer 410 may have a thickness of at least about 1 mm, such as, at least about 1.3 mm or at least about 1.5 mm or at least about 1.7 mm or at least about 2.0 mm or at least about 2.3 mm or at least about 2.5 mm or at least about 2.7 mm or at least about 3.0 mm or at least about 3.3 mm or at least about 3.5 mm or at least about 3.7 mm or at least about 4.0 mm or at least about 4.3 mm or at least about 4.5 mm or at least about 4.7 mm or at least about 5.0 mm or at least about 5.3 mm or at least about 5.5 mm or at least about 5.7 mm or at least about 6.0 mm or at least about 6.3 mm or at least about 6.5 mm or even at least about 7.0 mm. According to still other embodiments, the first porous layer 410 may have a thickness of not greater than about 13 mm, such as, not greater than about 12.8 mm or not greater than about 12.5 mm or not greater than about 12.2 mm or not greater than about 12.0 mm or not greater than about 11.8 mm or not greater than about 11.5 mm or not greater than about 11.2 mm or not greater than about 11.0 mm or not greater than about 10.8 mm or not greater than about 10.5 mm or not greater than about 10.2 mm or not greater than about 10.0 mm or not greater than about 9.8 mm or not greater than about 9.5 mm or not greater than about 9.2 mm or not greater than about 9.0 mm or not greater than about 8.8 mm or not greater than about 8.5 mm or not greater than about 8.2 mm or even not greater than about 8.0 mm. It will be appreciated that the thickness of the first porous layer 410 may be within a range between any of the minimum and maximum values noted above. It will be further appreciated that the thickness of the first porous layer 410 may be any value between any of the minimum and maximum values noted above.

According to certain embodiments, the first barrier layer 110 may include a particular material. For example, the first barrier layer 110 may include a polyaramid material, a polyimide material, or as combination thereof. According to still other embodiments, the first barrier layer 110 may consist essentially of a particular material. For example, the first barrier layer 110 may consist essentially of a polyaramid material, a polyimide material, or as combination thereof.

According to yet other embodiments, the first barrier layer 420 may have a particular thickness. For example, the first barrier layer 420 may have a thickness of at least about 0.10 mm, such as, at least about 0.13 mm or at least about 0.15 mm or at least about 0.17 mm or at least about 0.20 mm or at least about 0.23 mm or at least about 0.25 mm or at least about 0.27 mm or at least about 0.30 mm or at least about 0.33 mm or even at least about 0.35 mm. According to still other embodiments, the first barrier layer 420 may have a thickness of not greater than about 0.55 mm, such as, not greater than about 0.52 mm or not greater than about 0.50 mm or not greater than about 0.48 mm or not greater than about 0.45 mm or not greater than about 0.42 mm or even not greater than about 0.40 mm. It will be appreciated that the thickness of the first barrier layer 420 may be within a range between any of the minimum and maximum values noted above. It will be further appreciated that the thickness of the first barrier layer 420 may be any value between any of the minimum and maximum values noted above.

According to yet other embodiments, the thermal barrier composite 400 may have a particular thickness. For example, the thermal barrier composite 400 may have a thickness of at least about 1.0 mm, such as, at least about 1.03 mm or at least about 1.05 mm or at least about 1.07 mm or at least about 1.10 mm or at least about 1.13 mm or at least about 1.15 mm or at least about 1.17 mm or at least about 1.20 mm or at least about 1.30 mm or at least about 1.40 mm or at least about 1.50 mm or at least about 2.0 mm or at least about 2.5 mm or at least about 3.0 mm or at least about 3.5 mm or at least about 4.0 mm or at least about 4.5 mm or at least about 5.0 mm or at least about 5.5 mm or even at least about 6.0 mm. According to yet other embodiments, the thermal barrier composite 400 may have a thickness of not greater than about 13 mm, such as, not greater than about 12.5 mm or not greater than about 12.0 mm or not greater than about 11.5 mm or not greater than about 11.0 mm or not greater than about 10.5 mm or not greater than about 10.0 mm or not greater than about 9 mm or not greater than about 8.5 mm or even not greater than about 8.0 mm. It will be appreciated that the thickness of the thermal barrier composite 400 may be within a range between any of the minimum and maximum values noted above. It will be further appreciated that the thickness of the thermal barrier composite 400 may be any value between any of the minimum and maximum values noted above.

According to still other embodiments, the thermal barrier composite 400 may have a particular thickness ratio PL1/BL1, where PL1 is equal to the thickness of the first porous layer and BL1 is equal to the thickness of the first barrier layer. For example, the thermal barrier composite 400 may have a thickness ratio PL1/BL1 of at least about 2.0, such as, at least about 5.0 or at least about 10 or at least about 15 or at least about 20 or at least about 25 or at least about 30 or at least about 35 or at least about 40 or at least about 45 or at least about 50 or at least about 55 or at least about 60 or at least about 65 or even at least about 70. According to still other embodiments, the thermal barrier composite 400 may have a thickness ratio PL1/BL1 of not greater than about 99, such as, not greater than about 95 or not greater than about 90 or not greater than about 85 or not greater than about 80 or even not greater than about 75. It will be appreciated that the thickness ratio PL1/BL1 of the thermal barrier composite 400 may be within a range between any of the minimum and maximum values noted above. It will be further appreciated that the thickness ratio PL1/BL1 of the thermal barrier composite 400 may be any value between any of the minimum and maximum values noted above.

According to yet other embodiments, the thermal barrier composite 400 may have a particular thickness ratio PL1/CF, where PL1 is equal to the thickness of the first porous layer and CF is equal to the thickness of the composite. For example, the thermal barrier composite 400 may have a thickness ratio PL1/CF of at least about 0.50, such as, at least about 0.52 or at least about 0.54 or at least about 0.56 or at least about 0.58 or at least about 0.60 or at least about 0.62 or at least about 0.64 or at least about 0.66 or at least about 0.68 or at least about 0.70 or at least about 0.72 or at least about 0.74 or at least about 0.76 or at least about 0.78 or even at least about 0.80. According to yet other embodiments, the thermal barrier composite 400 may have a thickness ratio PL1/CF of not greater than about 0.99 or not greater than about 0.96 or not greater than about 0.94 or not greater than about 0.92 or not greater than about 0.90 or not greater than about 0.88 or not greater than about 0.86 or not greater than about 0.84 or not greater than about 0.82 or even not greater than about 0.80. It will be appreciated that the thickness ratio PL1/CF of the thermal barrier composite 400 may be within a range between any of the minimum and maximum values noted above. It will be further appreciated that the thickness ratio PL1/CF of the thermal barrier composite 400 may be any value between any of the minimum and maximum values noted above.

According to yet other embodiments, the thermal barrier composite 400 may have a particular thickness ratio BL1/CF, where BL1 is equal to the thickness of the first barrier layer and CF is equal to the thickness of the composite. For example, the thermal barrier composite 400 may have a thickness ratio BL1/CF of at least about 0.01, such as, at least about 0.02 or at least about 0.04 or at least about 0.06 or at least about 0.08 or at least about 0.10 or at least about 0.12 or at least about 0.14 or at least about 0.16 or at least about 0.18 or at least about 0.20 or at least about 0.22 or at least about 0.24 or even at least about 0.26. According to yet other embodiments, the thermal barrier composite 400 may have a thickness ratio BL1/CF of not greater than about 0.4, such as, not greater than about 0.38 or not greater than about 0.36 or not greater than about 0.34 or not greater than about 0.32 or not greater than about 0.30 or even not greater than about 0.28. It will be appreciated that the thickness ratio BL1/CF of the thermal barrier composite 400 may be within a range between any of the minimum and maximum values noted above. It will be further appreciated that the thickness ratio BL1/CF of the thermal barrier composite 400 may be any value between any of the minimum and maximum values noted above.

Figure 5:
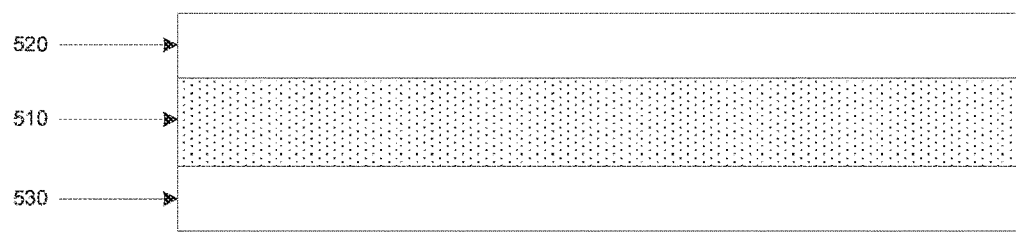
FIG. 5 includes an illustration of another example thermal barrier composite according to certain embodiments described herein.

FIG. 5 shows another thermal barrier composite 500 according to embodiments described herein. As shown in FIG. 5, the thermal barrier composite 500 may include a first porous layer 510, a first barrier layer 520 overlying the first porous layer 510, and a second barrier layer 530 underlying the first porous layer 510. As shown in FIG. 5, the first porous layer 510 may be located between the first barrier layer 520 and the second barrier layer 530.

It will be appreciated that the thermal barrier composite 500 and all components described in reference to the thermal barrier composite 500 as shown in FIG. 5 may have any of the characteristics described herein with reference to corresponding components in FIG. 4. In particular, the characteristics of the thermal barrier composite 500, the first porous layer 510, and the first barrier layer 520 shown in FIG. 5 may have any of the corresponding characteristics described herein in reference to thermal barrier composite 400, the first porous layer 410, and the first barrier layer 420 shown in FIG. 4, respectively.

According to yet other embodiments, the thermal barrier composite 500 may have a particular flame resistance rating. According to certain embodiments, the thermal barrier composite 500 may have a flame resistance rating of not greater than about 180° C., such as, not greater than about 175° C. or not greater than about 170° C. or not greater than about 165° C. or not greater than about 160° C. or not greater than about 155° C. or not greater than about 150° C. or not greater than about 145° C. or not greater than about 140° C. or not greater than about 135° C. or not greater than about 130° C. or not greater than about 125° C. or even not greater than about 120° C. It will be appreciated that the flame resistance rating of the thermal barrier composite 500 may be within a range between any of the values noted above. It will be further appreciated that the flame resistance rating of the thermal barrier composite 500 may be any value between any of the minimum and maximum values noted above.

According to yet other embodiments, the thermal barrier composite 500 may have a particular compression rating. According to certain embodiments, the thermal barrier composite 500 may have a 50% strain compression rating of not greater than about 600 kPa, such as, not greater than about 575 kPa or not greater than about 550 kPa or not greater than about 525 kPa or not greater than about 500 kPa or not greater than about 475 kPa or not greater than about 450 kPa or not greater than about 425 kPa or not greater than about 400 kPa or not greater than about 375 kPa or not greater than about 350 kPa or not greater than about 325 kPa or not greater than about 300 kPa or not greater than about 275 kPa or not greater than about 250 kPa or not greater than about 225 kPa or not greater than about 200 kPa. It will be appreciated that the 50% strain compression rating of the thermal barrier composite 500 may be within a range between any of the values noted above. It will be further appreciated that the 50% strain compression rating of the thermal barrier composite 500 may be any value between any of the minimum and maximum values noted above.

According to yet other embodiments, the thermal barrier composite 500 may have a particular density. According to certain embodiments, the thermal barrier composite 500 may have a density of not greater than about 560 kg/m$^3$, such as, not great than about 540 kg/m$^3$ or not greater than about 520 kg/m$^3$ or not greater than about 500 kg/m$^3$ or not greater than about 480 kg/m$^3$ or not greater than about 460 kg/m$^3$ or not greater than about 440 kg/m$^3$ or not greater than about 420 kg/m$^3$ or not greater than about 400 kg/m$^3$ or not greater than about 380 kg/m$^3$ or not greater than about 360 kg/m$^3$ or not greater than about 340 kg/m$^3$ or not greater than about 320 kg/m$^3$ or even not greater than about 300 kg/m$^3$. According to yet other embodiments, the thermal barrier composite 500 may have a density of at least about 140 kg/m$^3$, such as, at least about 160 kg/m$^3$ or at least about 180 kg/m$^3$ or at least about 200 kg/m$^3$ or at least about 220 kg/m$^3$ or at least about 240 kg/m$^3$ or at least about 260 kg/m$^3$ or even at least about 280 kg/m$^3$. It will be appreciated that the density of the thermal barrier composite 500 may be within a range between any of the minimum and maximum values noted above. It will be further appreciated that the density of the thermal barrier composite 500 may be any value between any of the minimum and maximum values noted above.

According to certain embodiments, the second barrier layer 530 may include a particular material. For example, the second barrier layer 530 may include a polyaramid material, a polyimide material, or as combination thereof. According to still other embodiments, the second barrier layer 530 may consist essentially of a particular material. For example, the second barrier layer 530 may consist essentially of a polyaramid material, a polyimide material, or as combination thereof.

According to yet other embodiments, the second barrier layer 530 may have a particular thickness. For example, the second barrier layer 530 may have a thickness of at least about 0.10 mm, such as, at least about 0.13 mm or at least about 0.15 mm or at least about 0.17 mm or at least about 0.20 mm or at least about 0.23 mm or at least about 0.25 mm or at least about 0.27 mm or at least about 0.30 mm or at least about 0.33 mm or even at least about 0.35 mm. According to still other embodiments, the second barrier layer 530 may have a thickness of not greater than about 0.55 mm, such as, not greater than about 0.52 mm or not greater than about 0.50 mm or not greater than about 0.48 mm or not greater than about 0.45 mm or not greater than about 0.42 mm or even not greater than about 0.40 mm. It will be appreciated that the thickness of the second barrier layer 530 may be within a range between any of the minimum and maximum values noted above. It will be further appreciated that the thickness of the second barrier layer 530 may be any value between any of the minimum and maximum values noted above.

According to still other embodiments, the thermal barrier composite 500 may have a particular thickness ratio PL1/BL2, where PL1 is equal to the thickness of the first porous layer and BL2 is equal to the thickness of the second barrier layer. For example, the thermal barrier composite 500 may have a thickness ratio PL1/BL2 of at least about 2.0, such as, at least about 5.0 or at least about 10 or at least about 15 or at least about 20 or at least about 25 or at least about 30 or at least about 35 or at least about 40 or at least about 45 or at least about 50 or at least about 55 or at least about 60 or at least about 65 or even at least about 70. According to still other embodiments, the thermal barrier composite 500 may have a thickness ratio PL1/BL2 of not greater than about 99, such as, not greater than about 95 or not greater than about 90 or not greater than about 85 or not greater than about 80 or even not greater than about 75. It will be appreciated that the thickness ratio PL1/BL2 of the thermal barrier composite 500 may be within a range between any of the minimum and maximum values noted above. It will be further appreciated that the thickness ratio PL1/BL2 of the thermal barrier composite 500 may be any value between any of the minimum and maximum values noted above.

According to yet other embodiments, the thermal barrier composite 500 may have a particular thickness ratio BL2/CF, where BL2 is equal to the thickness of the second barrier layer and CF is equal to the thickness of the composite. For example, the thermal barrier composite 500 may have a thickness ratio BL2/CF of at least about 0.01, such as, at least about 0.02 or at least about 0.04 or at least about 0.06 or at least about 0.08 or at least about 0.10 or at least about 0.12 or at least about 0.14 or at least about 0.16 or at least about 0.18 or at least about 0.20 or at least about 0.22 or at least about 0.24 or even at least about 0.26. According to yet other embodiments, the thermal barrier composite 500 may have a thickness ratio BL2/CF of not greater than about 0.4, such as, not greater than about 0.38 or not greater than about 0.36 or not greater than about 0.34 or not greater than about 0.32 or not greater than about 0.30 or even not greater than about 0.28. It will be appreciated that the thickness ratio BL2/CF of the thermal barrier composite 500 may be within a range between any of the minimum and maximum values noted above. It will be further appreciated that the thickness ratio BL2/CF of the thermal barrier composite 500 may be any value between any of the minimum and maximum values noted above.

Figure 6:
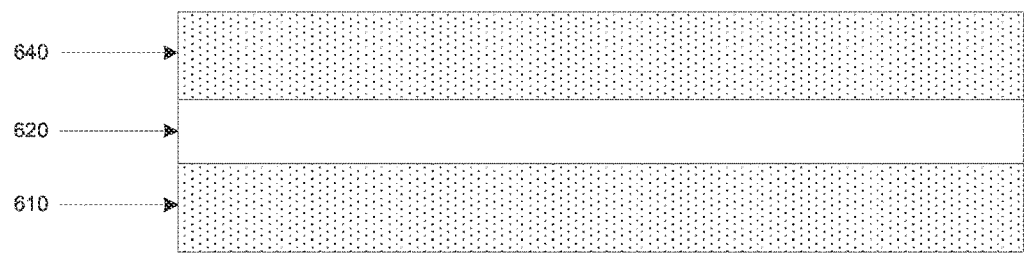
FIG. 6 includes an illustration of another example thermal barrier composite according to certain embodiments described herein.

FIG. 6 shows another thermal barrier composite 600 according to embodiments described herein. As shown in FIG. 6, the thermal barrier composite 600 may include a first porous layer 610, a first barrier layer 620 overlying the first porous layer 610, and a second porous layer 640 overlying the first barrier layer 620. As shown in FIG. 6, the first barrier layer 620 may be located between the first porous layer 610 and the second porous layer 640.

It will be appreciated that the thermal barrier composite 600 and all components described in reference to the thermal barrier composite 600 as shown in FIG. 6 may have any of the characteristics described herein with reference to corresponding components in FIG. 4 and/or FIG. 5. In particular, the characteristics of the thermal barrier composite 600, the first porous layer 610, and the first barrier layer 620 shown in FIG. 6 may have any of the corresponding characteristics described herein in reference to thermal barrier composite 400 (200), the first porous layer 410 (210), and the first barrier layer 420 (220) shown in FIG. 4 (FIG. 5), respectively.

According to yet other embodiments, the thermal barrier composite 600 may have a particular flame resistance rating. According to certain embodiments, the thermal barrier composite 600 may have a flame resistance rating of not greater than about 180° C., such as, not greater than about 175° C. or not greater than about 170° C. or not greater than about 165° C. or not greater than about 160° C. or not greater than about 155° C. or not greater than about 150° C. or not greater than about 145° C. or not greater than about 140° C. or not greater than about 135° C. or not greater than about 130° C. or not greater than about 125° C. or even not greater than about 120° C. It will be appreciated that the flame resistance rating of the thermal barrier composite 600 may be within a range between any of the values noted above. It will be further appreciated that the flame resistance rating of the thermal barrier composite 600 may be any value between any of the minimum and maximum values noted above.

According to yet other embodiments, the thermal barrier composite 600 may have a particular compression rating. According to certain embodiments, the thermal barrier composite 600 may have a 50% strain compression rating of not greater than about 600 kPa, such as, not greater than about 575 kPa or not greater than about 550 kPa or not greater than about 525 kPa or not greater than about 500 kPa or not greater than about 475 kPa or not greater than about 450 kPa or not greater than about 425 kPa or not greater than about 400 kPa or not greater than about 375 kPa or not greater than about 350 kPa or not greater than about 325 kPa or not greater than about 300 kPa or not greater than about 275 kPa or not greater than about 250 kPa or not greater than about 225 kPa or not greater than about 200 kPa. It will be appreciated that the 50% strain compression rating of the thermal barrier composite 600 may be within a range between any of the values noted above. It will be further appreciated that the 50% strain compression rating of the thermal barrier composite 600 may be any value between any of the minimum and maximum values noted above.

According to yet other embodiments, the thermal barrier composite 600 may have a particular density. According to certain embodiments, the thermal barrier composite 600 may have a density of not greater than about 560 kg/m$^3$, such as, not great than about 540 kg/m$^3$ or not greater than about 520 kg/m$^3$ or not greater than about 500 kg/m$^3$ or not greater than about 480 kg/m$^3$ or not greater than about 460 kg/m$^3$ or not greater than about 440 kg/m$^3$ or not greater than about 420 kg/m$^3$ or not greater than about 400 kg/m$^3$ or not greater than about 380 kg/m$^3$ or not greater than about 360 kg/m$^3$ or not greater than about 340 kg/m$^3$ or not greater than about 320 kg/m$^3$ or even not greater than about 300 kg/m$^3$. According to yet other embodiments, the thermal barrier composite 600 may have a density of at least about 140 kg/m$^3$, such as, at least about 160 kg/m$^3$ or at least about 180 kg/m$^3$ or at least about 200 kg/m$^3$ or at least about 220 kg/m$^3$ or at least about 240 kg/m$^3$ or at least about 260 kg/m$^3$ or even at least about 280 kg/m$^3$. It will be appreciated that the density of the thermal barrier composite 600 may be within a range between any of the minimum and maximum values noted above. It will be further appreciated that the density of the thermal barrier composite 600 may be any value between any of the minimum and maximum values noted above.

According to yet other embodiments, the second porous layer 640 may include particular materials. For example, the second porous layer 640 may include silicon material.

According to yet other embodiments, the second porous layer 640 may include a particular content of silicon material. For example, the second porous layer 640 may include a silicon material content of at least about 30 wt. % for a total weight of the second porous layer 640, such as, at least about 35 wt. % or at least about 40 wt. % or at least about 45 wt. % or at least about 50 wt. % or at least about 55 wt. % or at least about 60 wt. % or at least about 70 wt. % or at least about 80 wt. % or at least about 90 wt. % or even at least about 95 wt. %. According to yet other embodiments, the second porous layer 640 may include a silicon material content of or not greater than about 99 wt. %, such as, not greater than about 98 wt. % or not greater than about 97 wt. % or even not greater than about 96 wt. %. It will be appreciated that the silicon material content of the second porous layer 640 may be within a range between any of the minimum and maximum values noted above. It will be further appreciated that the silicon material content of the second porous layer 640 may be any value between any of the minimum and maximum values noted above.

According to yet other embodiments, the second porous layer 640 may include particular filler materials. For example, the filler material of the second porous layer 640 may include mica, kaolin, alumina trihydrate (ATH, hydrated alumina), alumina monohydrate (boehmite), or any combination thereof. According to still other embodiments, the filler material of the second porous layer 640 may include metal hydroxides, such as, for example, magnesium hydroxide (MDH), metal hydroxides, or any combination thereof. According to still other embodiments, the filler material of the second porous layer 640 may include silica, metal silicates, or any combination thereof. According to still other embodiments, the filler material of the second porous layer 640 may include carbonates, such as, for example, calcium carbonate, zinc borate, or any combination thereof. According to yet other embodiments, the filler material of the second porous layer 640 may include a metal oxide, such as, for example, aluminum oxide, zinc oxide, titanium dioxide, cerium oxide, iron oxide or any combination thereof.

According to still other embodiments, the second porous layer 640 may include a particular content of filler material. For example, the second porous layer 640 may include a filler material content of at least about 10 wt. % for a total weight of the second porous layer 640, such as, at least about 15 wt. % or at least about 20 wt. % or at least about 25 wt. % or at least about 30 wt. % or at least about 35 wt. % or at least about 40 wt. % or at least about 45 wt. % or at least about 50 wt. % or at least about 55 wt. % or at least about 60 wt. % or at least about 65 wt. % or at least about 70 wt. % or even at least about 75 wt. %. According to yet other embodiments, the second porous layer 640 may include a filler material content of or not greater than about 95 wt. %, such as, not greater than about 90 wt. % or not greater than about 85 wt. % or even not greater than about 80 wt. %. It will be appreciated that the silicon material content of the second porous layer 640 may be within a range between any of the minimum and maximum values noted above. It will be further appreciated that the silicon material content of the second porous layer 640 may be any value between any of the minimum and maximum values noted above.

According to particular embodiments, the second porous layer 640 may have a particular thickness. For example, the second porous layer 640 may have a thickness of at least about 1 mm, such as, at least about 1.3 mm or at least about 1.5 mm or at least about 1.7 mm or at least about 2.0 mm or at least about 2.3 mm or at least about 2.5 mm or at least about 2.7 mm or at least about 3.0 mm or at least about 3.3 mm or at least about 3.5 mm or at least about 3.7 mm or at least about 4.0 mm or at least about 4.3 mm or at least about 4.5 mm or at least about 4.7 mm or at least about 5.0 mm or at least about 5.3 mm or at least about 5.5 mm or at least about 5.7 mm or at least about 6.0 mm or at least about 6.3 mm or at least about 6.5 mm or even at least about 7.0 mm. According to still other embodiments, the second porous layer 640 may have a thickness of not greater than about 13 mm, such as, not greater than about 12.8 mm or not greater than about 12.5 mm or not greater than about 12.2 mm or not greater than about 12.0 mm or not greater than about 11.8 mm or not greater than about 11.5 mm or not greater than about 11.2 mm or not greater than about 11.0 mm or not greater than about 10.8 mm or not greater than about 10.5 mm or not greater than about 10.2 mm or not greater than about 10.0 mm or not greater than about 9.8 mm or not greater than about 9.5 mm or not greater than about 9.2 mm or not greater than about 9.0 mm or not greater than about 8.8 mm or not greater than about 8.5 mm or not greater than about 8.2 mm or even not greater than about 8.0 mm. It will be appreciated that the thickness of the second porous layer 640 may be within a range between any of the minimum and maximum values noted above. It will be further appreciated that the thickness of the second porous layer 640 may be any value between any of the minimum and maximum values noted above.

According to still other embodiments, the thermal barrier composite 600 may have a particular thickness ratio PL2/BL1, where PL2 is equal to the thickness of the first porous layer and BL1 is equal to the thickness of the first barrier layer. For example, the thermal barrier composite 600 may have a thickness ratio PL2/BL1 of at least about 2.0, such as, at least about 5.0 or at least about 10 or at least about 15 or at least about 20 or at least about 25 or at least about 30 or at least about 35 or at least about 40 or at least about 45 or at least about 50 or at least about 55 or at least about 60 or at least about 65 or even at least about 70. According to still other embodiments, the thermal barrier composite 600 may have a thickness ratio PL2/BL1 of not greater than about 99, such as, not greater than about 95 or not greater than about 90 or not greater than about 85 or not greater than about 80 or even not greater than about 75. It will be appreciated that the thickness ratio PL2/BL1 of the thermal barrier composite 600 may be within a range between any of the minimum and maximum values noted above. It will be further appreciated that the thickness ratio PL2/BL1 of the thermal barrier composite 600 may be any value between any of the minimum and maximum values noted above.

According to yet other embodiments, the thermal barrier composite 600 may have a particular thickness ratio PL2/CF, where PL2 is equal to the thickness of the first porous layer and CF is equal to the thickness of the composite. For example, the thermal barrier composite 600 may have a thickness ratio PL2/CF of at least about 0.35, such as, at least about 0.37 or at least about 0.39 or at least about 0.40 or at least about 0.45 or at least about 0.50 or at least about 0.55 or at least about 0.60 or at least about 0.65 or at least about 0.70 or at least about 0.75 or even at least about 0.80. According to yet other embodiments, the thermal barrier composite 600 may have a thickness ratio PL2/CF of not greater than about 0.99 or not greater than about 0.96 or not greater than about 0.94 or not greater than about 0.92 or not greater than about 0.90 or not greater than about 0.88 or not greater than about 0.86 or not greater than about 0.84 or not greater than about 0.82 or even not greater than about 0.80. It will be appreciated that the thickness ratio PL2/CF of the thermal barrier composite 600 may be within a range between any of the minimum and maximum values noted above. It will be further appreciated that the thickness ratio PL2/CF of the thermal barrier composite 600 may be any value between any of the minimum and maximum values noted above.

According to certain embodiments, the thermal barrier composite described herein may be formed according to any acceptable forming process for a thermal barrier composite. According to a particular embodiment, the thermal barrier composite may be formed using a lamination process where the porous foam and barrier layer are laminated using a transfer adhesive such as, for example, a silicon adhesive, a rubber adhesive, an acrylic adhesive, a phenolic adhesive, a polyurethane based adhesive or any combination thereof. According to still other embodiments, the thermal barrier composite may be formed using a lamination process with a porous foam and a coated barrier layer, where the coating on the barrier layer is an adhesive, such as, a silicon adhesive, a rubber adhesive, an acrylic adhesive, a phenolic adhesive, a polyurethane based adhesive or any combination thereof. According to still other embodiments, the thermal barrier composite may be formed using a direct cast forming process, wherein the foam is directly cast onto the barrier films or between the barrier films.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1. A multilayer composite comprising: a first porous layer, and a first barrier layer overlying the first porous layer, wherein the first barrier layer comprises a polyaramid material, a polyimide material, or any combination thereof, wherein the multilayer composite comprises a flame resistance rating of not greater than about 180° C., and wherein the multilayer composite comprises a 50% strain compression rating of not greater than about 600 kPa.

Embodiment 2. The multilayer composite of embodiment 1, wherein the multilayer composite comprises a flame resistance rating of not greater than about 150° C.

Embodiment 3. The multilayer composite of embodiment 1, wherein the multilayer composite comprises a flame resistance rating of not greater than about 120° C.

Embodiment 4. The multilayer composite of embodiment 1, wherein the composite comprises a 50% strain compression rating of not greater than about 400 kPa.

Embodiment 5. The multilayer composite of embodiment 1, wherein the composite comprises a 50% strain compression rating of not greater than about 200 kPa.

Embodiment 6. The multilayer composite of embodiment 1, wherein the multilayer composite comprises a density of not greater than about 560 kg/m$^3$.

Embodiment 7. The multilayer composite of embodiment 6, wherein the multilayer composite comprises a density of at least about 140 kg/m$^3$.

Embodiment 8. The multilayer composite of embodiment 1, wherein the first porous layer comprises a silicone material.

Embodiment 9. The multilayer composite of embodiment 8, wherein the first porous layer comprises a silicon material content of at least about 30 wt. % for a total weight of the first porous layer.

Embodiment 10. The multilayer composite of embodiment 8, wherein the first porous layer comprises a silicon material content of not greater than about 99 wt. % for a total weight of the first porous layer.

Embodiment 11. The multilayer composite of embodiment 1, wherein the first porous layer comprises a filler material.

Embodiment 12. The multilayer composite of embodiment 11, wherein the first porous layer comprises a filler material content of at least about 10 wt. % for a total weight of the first porous layer.

Embodiment 13. The multilayer composite of embodiment 11, wherein the first porous layer comprises a filler material content of not greater than about 90 wt. % for a total weight of the first porous layer.

Embodiment 14. The multilayer composite of embodiment 11, wherein the filler material comprises mica kaolin.

Embodiment 15. The multilayer composite of embodiment 11, wherein the filler material comprises alumina trihydrate (ATH, hydrated alumina), alumina monohydrate (boehmite), magnesium hydroxide (MDH) and other metal hydroxides.

Embodiment 16. The multilayer composite of embodiment 11, wherein the filler material comprises silica.

Embodiment 17. The multilayer composite of embodiment 11, wherein the filler material comprises metal silicates.

Embodiment 18. The multilayer composite of embodiment 11, wherein the filler material comprises calcium carbonate and other carbonates.

Embodiment 19. The multilayer composite of embodiment 11, wherein the filler material comprises zinc borate.

Embodiment 20. The multilayer composite of embodiment 11, wherein the filler material comprises aluminum oxide, zinc oxide, titanium dioxide, cerium oxide, iron oxide and other metal oxides.

Embodiment 21. The multilayer composite of embodiment 1, wherein the composite comprises a thickness ratio PL1/BL1 of at least about 2.0, where PL1 is equal to the thickness of the first porous layer and BL1 is equal to the thickness of the first barrier layer.

Embodiment 22. The multilayer composite of embodiment 21, wherein the composite comprises a thickness ratio PL1/BL1 of not greater than about 99, where PL1 is equal to the thickness of the first porous layer and BL1 is equal to the thickness of the first barrier layer.

Embodiment 23. The multilayer composite of embodiment 1, wherein the composite comprises a thickness ratio PL1/CF of at least about 0.66, where PL1 is equal to the thickness of the first porous layer and CF is equal to the thickness of the composite.

Embodiment 24. The multilayer composite of embodiment 23, wherein the composite comprises a thickness ratio PL1/CF of not greater than about 0.99, where PL1 is equal to the thickness of the first porous layer and CF is equal to the thickness of the composite.

Embodiment 25. The multilayer composite of embodiment 1, wherein the composite comprises a thickness ratio BL1/CF of at least about 0.01, where BL1 is equal to the thickness of the first barrier layer and CF is equal to the thickness of the composite.

Embodiment 26. The multilayer composite of embodiment 25, wherein the composite comprises a thickness ratio BL1/CF of not greater than about 0.34, where BL1 is equal to the thickness of the first barrier layer and CF is equal to the thickness of the composite.

Embodiment 27. The multilayer composite of embodiment 1, wherein the first porous layer has a thickness PL1 of at least about 1 mm.

Embodiment 28. The multilayer composite of embodiment 27, wherein the first porous layer has a thickness PL1 of not greater than about 13 mm.

Embodiment 29. The multilayer composite of embodiment 1, wherein the first barrier layer has a thickness BL1 of at least about 0.13 mm.

Embodiment 30. The multilayer composite of embodiment 29, wherein the first barrier layer has a thickness BL1 of not greater than about 0.51 mm.

Embodiment 31. The multilayer composite of embodiment 1, wherein the composite has a thickness CF of at least about 1.13 mm.

Embodiment 32. The multilayer composite of embodiment 31, wherein the composite has a thickness CF of not greater than about 13 mm.

Embodiment 33. The multilayer composite of embodiment 1, wherein the composite further comprises a second barrier layer, wherein the second barrier layer comprises a polyaramid material, a polyimide material, or any combination thereof, and wherein the first porous layer is between the first barrier layer and the second barrier layer.

Embodiment 34. The multilayer composite of embodiment 33, wherein the multilayer composite comprises a flame resistance rating of not greater than about 150° C.

Embodiment 35. The multilayer composite of embodiment 33, wherein the multilayer composite comprises a flame resistance rating of not greater than about 120° C.

Embodiment 36. The multilayer composite of embodiment 35, wherein the composite comprises a 50% strain compression rating of not greater than about 400 kPa.

Embodiment 37. The multilayer composite of embodiment 33, wherein the composite comprises a 50% strain compression rating of not greater than about 200 kPa.

Embodiment 38. The multilayer composite of embodiment 33, wherein the multilayer composite comprises a density of not greater than about 560 kg/m$^3$.

Embodiment 39. The multilayer composite of embodiment 38, wherein the multilayer composite comprises a density of at least about 144 kg/m$^3$.

Embodiment 40. The multilayer composite of embodiment 33, wherein the composite comprises a thickness ratio PL1/BL2 of at least about 2.0, where PL1 is equal to the thickness of the first porous layer and BL2 is equal to the thickness of the second barrier layer.

Embodiment 41. The multilayer composite of embodiment 40, wherein the composite comprises a thickness ratio PL1/BL2 of not greater than about 98, where PL1 is equal to the thickness of the first porous layer and BL2 is equal to the thickness of the second barrier layer.

Embodiment 42. The multilayer composite of embodiment 33, wherein the composite comprises a thickness ratio BL2/CF of at least about 0.1, where BL2 is equal to the thickness of the second barrier layer and CF is equal to the thickness of the composite.

Embodiment 43. The multilayer composite of embodiment 42, wherein the composite comprises a thickness ratio BL2/CF of not greater than about 0.34, where BL2 is equal to the thickness of the second barrier layer and CF is equal to the thickness of the composite.

Embodiment 44. The multilayer composite of embodiment 33, wherein the second barrier layer has a thickness BL2 of at least about 0.13 mm.

Embodiment 45. The multilayer composite of embodiment 44, wherein the second barrier layer has a thickness BL2 of not greater than about 0.51 mm.

Embodiment 46. The multilayer composite of embodiment 1, wherein the composite further comprises a second porous layer, wherein the first barrier layer is between the first porous layer and the second porous layer.

Embodiment 47. The multilayer composite of embodiment 46, wherein the multilayer composite comprises a flame resistance rating of not greater than about 150° C.

Embodiment 48. The multilayer composite of embodiment 46, wherein the multilayer composite comprises a flame resistance rating of not greater than about 120° C.

Embodiment 49. The multilayer composite of embodiment 48, wherein the composite comprises a 50% strain compression rating of not greater than about 400 kPa.

Embodiment 50. The multilayer composite of embodiment 46, wherein the composite comprises a 50% strain compression rating of not greater than about 300 kPa.

Embodiment 51. The multilayer composite of embodiment 50, wherein the composite comprises a 50% strain compression rating of not greater than about 200 kPa.

Embodiment 52. The multilayer composite of embodiment 46, wherein the multilayer composite comprises a density of not greater than about 560 kg/m³.

Embodiment 53. The multilayer composite of embodiment 52, wherein the multilayer composite comprises a density of at least about 144 kg/m³.

Embodiment 54. The multilayer composite of embodiment 46, wherein the second porous layer comprises a silicone material.

Embodiment 55. The multilayer composite of embodiment 54, wherein the second porous layer comprises a silicon material content of at least about 30 wt. % for a total weight of the second porous layer.

Embodiment 56. The multilayer composite of embodiment 54, wherein the second porous layer comprises a silicon material content of not greater than about 99 wt. % for a total weight of the second porous layer.

Embodiment 57. The multilayer composite of embodiment 46, wherein the second porous layer comprises a filler material.

Embodiment 58. The multilayer composite of embodiment 57, wherein the second porous layer comprises a filler material content of at least about 10 wt. % for a total weight of the second porous layer.

Embodiment 59. The multilayer composite of embodiment 57, wherein the second porous layer comprises a filler material content of not greater than about 90 wt. % for a total weight of the second porous layer.

Embodiment 60. The multilayer composite of embodiment 57, wherein the filler material comprises mica kaolin.

Embodiment 61. The multilayer composite of embodiment 57, wherein the filler material comprises alumina trihydrate (ATH, hydrated alumina), alumina monohydrate (boehmite), magnesium hydroxide (MDH) and other metal hydroxides.

Embodiment 62. The multilayer composite of embodiment 57, wherein the filler material comprises silica.

Embodiment 63. The multilayer composite of embodiment 57, wherein the filler material comprises metal silicates.

Embodiment 64. The multilayer composite of embodiment 57, wherein the filler material comprises calcium carbonate and other carbonates.

Embodiment 65. The multilayer composite of embodiment 57, wherein the filler material comprises zinc borate.

Embodiment 66. The multilayer composite of embodiment 57, wherein the filler material comprises aluminum oxide, zinc oxide, titanium dioxide, cerium oxide, iron oxide and other metal oxides.

Embodiment 67. The multilayer composite of embodiment 46, wherein the composite comprises a thickness ratio PL2/BL1 of at least about 2.0, where PL2 is equal to the thickness of the second porous layer and BL1 is equal to the thickness of the first barrier layer.

Embodiment 68. The multilayer composite of embodiment 67, wherein the composite comprises a thickness ratio PL2/BL1 of not greater than about 91.3, where PL2 is equal to the thickness of the second porous layer and BL1 is equal to the thickness of the first barrier layer.

Embodiment 69. The multilayer composite of embodiment 46, wherein the composite comprises a thickness ratio PL2/CF of at least about 0.39, where PL2 is equal to the thickness of the second porous layer and CF is equal to the thickness of the composite.

Embodiment 70. The multilayer composite of embodiment 69, wherein the composite comprises a thickness ratio PL2/CF of not greater than about 0.91, where PL2 is equal to the thickness of the second porous layer and CF is equal to the thickness of the composite.

Embodiment 71. The multilayer composite of embodiment 46, wherein the second porous layer has a thickness PL2 of at least about 1.0 mm.

Embodiment 72. The multilayer composite of embodiment 71, wherein the second porous layer has a thickness PL2 of not greater than about 11.87 mm.

Embodiment 73. A thermal barrier composite comprising: a first porous layer, and a first barrier layer overlying the first porous layer, wherein the first barrier layer comprises a polyaramid material, a polyimide material, or any combination thereof, wherein the thermal barrier composite comprises a flame resistance rating of at least about 200° C., and wherein the thermal barrier composite comprises a compression rating of not greater than about 350 kPa at 50% strain.

Embodiment 74. The thermal barrier composite of embodiment 73, wherein the thermal barrier composite comprises a flame resistance rating of not greater than about 150° C.

Embodiment 75. The thermal barrier composite of embodiment 73, wherein the thermal barrier composite comprises a flame resistance rating of not greater than about 120° C.

Embodiment 76. The thermal barrier composite of embodiment 75, wherein the thermal barrier composite comprises a 50% strain compression rating of not greater than about 400 kPa.

Embodiment 77. The thermal barrier composite of embodiment 73, wherein the thermal barrier composite comprises a 50% strain compression rating of not greater than about 200 kPa.

Embodiment 78. The thermal barrier composite of embodiment 73, wherein the thermal barrier composite comprises a density of not greater than about 560 kg/m³.

Embodiment 79. The thermal barrier composite of embodiment 78, wherein the thermal barrier composite comprises a density of at least about 140 kg/m³.

Embodiment 80. The thermal barrier composite of embodiment 73, wherein the first porous layer comprises a silicone material.

Embodiment 81. The thermal barrier composite of embodiment 73, wherein the first porous layer comprises a silicon material content of at least about 30 wt. % for a total weight of the first porous layer.

Embodiment 82. The thermal barrier composite of embodiment 81, wherein the first porous layer comprises a silicon material content of not greater than about 99 wt. % for a total weight of the first porous layer.

Embodiment 83. The thermal barrier composite of embodiment 73, wherein the first porous layer comprises a filler material.

Embodiment 84. The thermal barrier composite of embodiment 83, wherein the first porous layer comprises a filler material content of at least about 10 wt. % for a total weight of the first porous layer.

Embodiment 85. The thermal barrier composite of embodiment 83, wherein the first porous layer comprises a filler material content of not greater than about 90 wt. % for a total weight of the first porous layer.

Embodiment 86. The thermal barrier composite of embodiment 83, wherein the filler material comprises mica kaolin.

Embodiment 87. The thermal barrier composite of embodiment 83, wherein the filler material comprises alumina trihydrate (ATH, hydrated alumina), alumina monohydrate (boehmite), magnesium hydroxide (MDH) and other metal hydroxides.

Embodiment 88. The thermal barrier composite of embodiment 83, wherein the filler material comprises silica.

Embodiment 89. The thermal barrier composite of embodiment 83, wherein the filler material comprises metal silicates.

Embodiment 90. The thermal barrier composite of embodiment 83, wherein the filler material comprises calcium carbonate and other carbonates.

Embodiment 91. The thermal barrier composite of embodiment 83, wherein the filler material comprises zinc borate.

Embodiment 92. The thermal barrier composite of embodiment 83, wherein the filler material comprises aluminum oxide, zinc oxide, titanium dioxide, cerium oxide, iron oxide and other metal oxides.

Embodiment 93. The thermal barrier composite of embodiment 73, wherein the composite comprises a thickness ratio PL1/BL1 of at least about 2.0, where PL1 is equal to the thickness of the first porous layer and BL1 is equal to the thickness of the first barrier layer.

Embodiment 94. The thermal barrier composite of embodiment 93, wherein the composite comprises a thickness ratio PL1/BL1 of not greater than about 99, where PL1 is equal to the thickness of the first porous layer and BL1 is equal to the thickness of the first barrier layer.

Embodiment 95. The thermal barrier composite of embodiment 73, wherein the composite comprises a thickness ratio PL1/CF of at least about 0.66, where PL1 is equal to the thickness of the first porous layer and CF is equal to the thickness of the composite.

Embodiment 96. The thermal barrier composite of embodiment 95, wherein the composite comprises a thickness ratio PL1/CF of not greater than about 0.99, where PL1 is equal to the thickness of the first porous layer and CF is equal to the thickness of the composite.

Embodiment 97. The thermal barrier composite of embodiment 73, wherein the composite comprises a thickness ratio BL1/CF of at least about 0.01, where BL1 is equal to the thickness of the first barrier layer and CF is equal to the thickness of the composite.

Embodiment 98. The thermal barrier composite of embodiment 97, wherein the composite comprises a thickness ratio BL1/CF of not greater than about 0.34, where BL1 is equal to the thickness of the first barrier layer and CF is equal to the thickness of the composite.

Embodiment 99. The thermal barrier composite of embodiment 73, wherein the first porous layer has a thickness PL1 of at least about 1 mm.

Embodiment 100. The thermal barrier composite of embodiment 99, wherein the first porous layer has a thickness PL1 of not greater than about 13 mm.

Embodiment 101. The thermal barrier composite of embodiment 73, wherein the first barrier layer has a thickness BL1 of at least about 0.13 mm.

Embodiment 102. The thermal barrier composite of embodiment 101, wherein the first barrier layer has a thickness BL1 of not greater than about 0.51 mm.

Embodiment 103. The thermal barrier composite of embodiment 73, wherein the composite has a thickness CF of at least about 1.13 mm.

Embodiment 104. The thermal barrier composite of embodiment 103, wherein the composite has a thickness CF of not greater than about 13 mm.

Embodiment 105. The thermal barrier composite of embodiment 73, wherein the composite further comprises a second barrier layer, wherein the second barrier layer comprises a polyaramid material, a polyimide material, or any combination thereof, and wherein the first porous layer is between the first barrier layer and the second barrier layer.

Embodiment 106. The thermal barrier composite of embodiment 105, wherein the thermal barrier composite comprises a flame resistance rating of not greater than about 150° C.

Embodiment 107. The thermal barrier composite of embodiment 105, wherein the thermal barrier composite comprises a flame resistance rating of not greater than about 120° C.

Embodiment 108. The thermal barrier composite of embodiment 107, wherein the thermal barrier composite comprises a 50% strain compression rating of not greater than about 400 kPa.

Embodiment 109. The thermal barrier composite of embodiment 105, wherein the thermal barrier composite comprises a 50% strain compression rating of not greater than about 200 kPa.

Embodiment 110. The thermal barrier composite of embodiment 105, wherein the thermal barrier composite comprises a density of not greater than about 560 kg/m$^3$.

Embodiment 111. The thermal barrier composite of embodiment 110, wherein the thermal barrier composite comprises a density of at least about 144 kg/m$^3$.

Embodiment 112. The thermal barrier composite of embodiment 105, wherein the composite comprises a thickness ratio PL1/BL2 of at least about 2.0, where PL1 is equal to the thickness of the first porous layer and BL2 is equal to the thickness of the second barrier layer.

Embodiment 113. The thermal barrier composite of embodiment 112, wherein the composite comprises a thickness ratio PL1/BL2 of not greater than about 98, where PL1 is equal to the thickness of the first porous layer and BL2 is equal to the thickness of the second barrier layer.

Embodiment 114. The thermal barrier composite of embodiment 105, wherein the composite comprises a thickness ratio BL2/CF of at least about 0.1, where BL2 is equal to the thickness of the second barrier layer and CF is equal to the thickness of the composite.

Embodiment 115. The thermal barrier composite of embodiment 114, wherein the composite comprises a thickness ratio BL2/CF of not greater than about 0.34, where BL2 is equal to the thickness of the second barrier layer and CF is equal to the thickness of the composite.

Embodiment 116. The thermal barrier composite of embodiment 105, wherein the second barrier layer has a thickness BL2 of at least about 0.13 mm.

Embodiment 117. The thermal barrier composite of embodiment 116, wherein the second barrier layer has a thickness BL2 of not greater than about 0.51 mm.

Embodiment 118. The thermal barrier composite of embodiment 73, wherein the composite further comprises a second porous layer, wherein the first barrier layer is between the first porous layer and the second porous layer.

Embodiment 119. The thermal barrier composite of embodiment 118, wherein the thermal barrier composite comprises a flame resistance rating of not greater than about 150° C.

Embodiment 120. The thermal barrier composite of embodiment 118, wherein the thermal barrier composite comprises a flame resistance rating of not greater than about 120° C.

Embodiment 121. The thermal barrier composite of embodiment 120, wherein the thermal barrier composite comprises a 50% strain compression rating of not greater than about 400 kPa.

Embodiment 122. The thermal barrier composite of embodiment 118, wherein the thermal barrier composite comprises a 50% strain compression rating of not greater than about 300 kPa.

Embodiment 123. The thermal barrier composite of embodiment 122, wherein the thermal barrier composite comprises a 50% strain compression rating of not greater than about 200 kPa.

Embodiment 124. The thermal barrier composite of embodiment 118, wherein the thermal barrier composite comprises a density of not greater than about 560 kg/m$^3$.

Embodiment 125. The thermal barrier composite of embodiment 124, wherein the thermal barrier composite comprises a density of at least about 144 kg/m$^3$.

Embodiment 126. The thermal barrier composite of embodiment 118, wherein the second porous layer comprises a silicone material.

Embodiment 127. The thermal barrier composite of embodiment 126, wherein the second porous layer comprises a silicon material content of at least about 30 wt. % for a total weight of the second porous layer.

Embodiment 128. The thermal barrier composite of embodiment 127, wherein the second porous layer comprises a silicon material content of not greater than about 99 wt. % for a total weight of the second porous layer.

Embodiment 129. The thermal barrier composite of embodiment 118, wherein the second porous layer comprises a filler material.

Embodiment 130. The thermal barrier composite of embodiment 129, wherein the second porous layer comprises a filler material content of at least about 10 wt. % for a total weight of the second porous layer.

Embodiment 131. The thermal barrier composite of embodiment 130, wherein the second porous layer comprises a filler material content of not greater than about 90 wt. % for a total weight of the second porous layer.

Embodiment 132. The thermal barrier composite of embodiment 129, wherein the filler material comprises mica kaolin.

Embodiment 133. The thermal barrier composite of embodiment 129, wherein the filler material comprises alumina trihydrate (ATH, hydrated alumina), alumina monohydrate (boehmite), magnesium hydroxide (MDH) and other metal hydroxides.

Embodiment 134. The thermal barrier composite of embodiment 129, wherein the filler material comprises silica.

Embodiment 135. The thermal barrier composite of embodiment 129, wherein the filler material comprises metal silicates.

Embodiment 136. The thermal barrier composite of embodiment 129, wherein the filler material comprises calcium carbonate and other carbonates.

Embodiment 137. The thermal barrier composite of embodiment 129, wherein the filler material comprises zinc borate.

Embodiment 138. The thermal barrier composite of embodiment 129, wherein the filler material comprises aluminum oxide, zinc oxide, titanium dioxide, cerium oxide, iron oxide and other metal oxides.

Embodiment 139. The thermal barrier composite of embodiment 118, wherein the composite comprises a thickness ratio PL2/BL1 of at least about 2.0, where PL2 is equal to the thickness of the second porous layer and BL1 is equal to the thickness of the first barrier layer.

Embodiment 140. The thermal barrier composite of embodiment 139, wherein the composite comprises a thickness ratio PL2/BL1 of not greater than about 91.3, where PL2 is equal to the thickness of the second porous layer and BL1 is equal to the thickness of the first barrier layer.

Embodiment 141. The thermal barrier composite of embodiment 118, wherein the composite comprises a thickness ratio PL2/CF of at least about 0.39, where PL2 is equal to the thickness of the second porous layer and CF is equal to the thickness of the composite.

Embodiment 142. The thermal barrier composite of embodiment 141, wherein the composite comprises a thickness ratio PL2/CF of not greater than about 0.91, where PL2 is equal to the thickness of the second porous layer and CF is equal to the thickness of the composite.

Embodiment 143. The thermal barrier composite of embodiment 118, wherein the second porous layer has a thickness PL2 of at least about 1.0 mm.

Embodiment 144. The thermal barrier composite of embodiment 143, wherein the second porous layer has a thickness PL2 of not greater than about 11.87 mm.

Embodiment 145. A battery pack comprising a thermal barrier composite as recited in any of the previous embodiments.

EXAMPLES

The concepts described herein will be further described in the following Examples, which do not limit the scope of the invention described in the claims.

Example 1

Eleven sample composites S1-S10 were formed according to embodiments described herein. Each sample composite included at least a first porous layer and a first barrier layer.

The first porous layer, and the second porous layer where applicable, for each of the sample composites S1-S10 were chosen from the following formulations. Pours layer option 1 (PLO1) is a silicone foam with aluminum trihydrate filler and a density of from 144 kg/m$^3$ to 272 kg/m$^3$. Pours layer option 2 (PLO2) is a silicone foam with aluminum trihydrate and iron oxide filler and a density of from 144 kg/m$^3$ to 272 kg/m$^3$. Pours layer option 3 (PLO3) is a silicone foam with aluminum trihydrate zinc borate, and an iron oxide filler, and it has a density of from 288 kg/m$^3$ to 400 kg/m$^3$. Porous layer option 4 (PLO4) is a silicone foam with Aluminum trihydrate, and iron oxide filler, and a density of from 288 kg/m$^3$ to 400 kg/m$^3$. Porous layer option 5 (PLO5) is a silicone foam with aluminum trihydrate, zinc borate, and iron oxide filler, and a density of from 288 kg/m$^3$ to 400 kg/m$^3$.

The first barrier layer, and the second barrier layer where applicable, for each of the sample composites S1-S10 were chosen from the following formulations. Barrier layer option 1 (BLO1) is a polyaramid layer. Barrier layer option 2 (BL02) is a polyimide layer.

Samples composites S1-S5 have a layer configuration of PL1/BL1, where PL1 is the first porous layer and BL1 is the first barrier layer. Samples S6-S8 have a layer configuration of BL2/PL1/BL2, where PL1 is the first porous layer, BL1 is the first barrier layer and BL2 is the second barrier layer. Samples S9 and S10 have a layer configuration of PL1/BL2/

PL2, where PL1 is the first porous layer, BL1 is the first barrier layer and PL2 is the second porous layer.

All ten sample composites S1-S10 were tested to determine a flame resistance rating, measured according to tested defined herein, and a 50% strain compression rating, measured according to tests defined herein.

The compositions and performance ratings (i.e. the flame resistance rating and the 50% strain compression rating) of the sample composites S1-S10 are summarized in Table 1 below.

TABLE 1

SAMPLE COMPOSITES S1-S10

| Samples | PL1 | BL1 | BL2 | PL2 | Composite Thickness (mm) | Flame Resistance Rating (° C.) | 50% Strain Compression Rating (kPa) |
|---|---|---|---|---|---|---|---|
| S1 | PL01 | BL01 | N/A | N/A | 3.3 | 150 | 69 |
| S2 | PL02 | BL01 | N/A | N/A | 3.4 | 131 | 55 |
| S3 | PL03 | BL01 | N/A | N/A | 2.9 | 114 | 283 |
| S4 | PL03 | BL02 | N/A | N/A | 2.7 | 200 | 386 |
| S5 | PL04 | BL01 | N/A | N/A | 2.0 | 120 | 503 |
| S6 | PL02 | BL01 | BL01 | N/A | 3.8 | 155 | 110 |
| S7 | PL03 | BL01 | BL01 | N/A | 3.0 | 182 | 442 |
| S8 | PL03 | BL02 | BL02 | N/A | 3.1 | 113 | 414 |
| S9 | PL03 | BL01 | N/A | PL03 | 5.4 | 103 | 324 |
| S10 | PL03 | BL02 | N/A | PL03 | 5.4 | 88 | 338 |

Four comparative sample composites CS1-CS6 were formed using only a porous layer and no barrier layer.

The porous layer for each of the sample comparative composites CS1-CS4 was chosen from the following formulations. Porous layer option 1 (PLO1) is a silicone foam with aluminum trihydrate filler and a density of from 144 kg/m³ to 272 kg/m³. Porous layer option 2 (PLO2) is a silicone foam with aluminum trihydrate and iron oxide filler and a density of from 144 kg/m³ to 272 kg/m³. Porous layer option 3 (PLO3) is a silicone foam with aluminum trihydrate zinc borate, and an iron oxide filler, and it has a density of from 288 kg/m³ to 400 kg/m³. Porous layer option 4 (PLO4) is a silicone foam with Aluminum trihydrate, and iron oxide filler, and a density of from 288 kg/m³ to 400 kg/m³. Porous layer option 5 (PLO5) is a silicone foam with aluminum trihydrate, zinc borate, and iron oxide filler, and a density of from 288 kg/m³ to 400 kg/m³.

The barrier layer for each of the sample comparative composites CS5 and CS6 were chosen from the following formulations. Barrier layer option 1 (BLO1) is a polyaramid layer. Barrier layer option 2 (BLO2) is a polyimide layer.

Comparative samples composites CS1-CS6 were tested to determine a flame resistance rating, measured according to tested defined herein, and a 50% strain compression rating, measured according to tests defined herein.

The compositions and performance ratings (i.e. the flame resistance rating and the 50% strain compression rating) of the comparative sample composites CS1-CS6 are summarized in Table 2 below.

TABLE 2

COMPARATIVE SAMPLE COMPOSITES CS1-CS6

| Samples | PL1 | BL1 | Composite Thickness (mm) | Flame Resistance Rating (° C.) | 50% Strain Compression Rating (kPa) |
|---|---|---|---|---|---|
| CS1 | PL01 | N/A | 3.1 | 174 | 62 |
| CS2 | PL02 | N/A | 3.4 | 166 | 48 |
| CS3 | PL03 | N/A | 2.7 | 161 | 290 |
| CS4 | PL04 | N/A | 1.8 | 182 | 379 |
| CS5 | N/A | BL01 | 0.4 | >200 | >600 |
| CS6 | N/A | BL02 | 0.13 | >200 | >600 |

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A multilayer composite comprising:
   a first porous layer comprising a silicone material, and
   a first barrier layer overlying the first porous layer, wherein the first barrier layer comprises a polyaramid material, a polyimide material, or any combination thereof,
   wherein the multilayer composite comprises a flame resistance rating of not greater than about 180° C., and
   wherein the multilayer composite comprises a 50% strain compression rating of not greater than about 600 kPa.

2. The multilayer composite of claim 1, wherein the multilayer composite comprises a flame resistance rating of not greater than about 150° C.

3. The multilayer composite of claim 1, wherein the composite comprises a 50% strain compression rating of not greater than about 400 kPa.

4. The multilayer composite of claim 1, wherein the multilayer composite comprises a density of not greater than about 560 kg/m³.

5. The multilayer composite of claim 4, wherein the multilayer composite comprises a density of at least about 140 kg/m³.

6. The multilayer composite of claim 1, wherein the first porous layer comprises a silicon material content of at least about 30 wt. % and not greater than about 99 wt. % for a total weight of the first porous layer.

7. The multilayer composite of claim 1, wherein the first porous layer comprises a filler material.

8. The multilayer composite of claim 7, wherein the first porous layer comprises a filler material content of at least about 10 wt. % and not greater than about 90 wt. % for a total weight of the first porous layer.

9. The multilayer composite of claim 7, wherein the filler material comprises mica kaolin.

10. The multilayer composite of claim 7, wherein the filler material comprises alumina trihydrate (ATH, hydrated alumina), alumina monohydrate (boehmite), magnesium hydroxide (MDH) and other metal hydroxides.

11. A thermal barrier composite comprising:
a first porous layer comprising a silicone material, and
a first barrier layer overlying the first porous layer, wherein the first barrier layer comprises a polyaramid material, a polyimide material, or any combination thereof,
wherein the thermal barrier composite comprises a flame resistance rating of at least about 200° C., and
wherein the thermal barrier composite comprises a compression rating of not greater than about 350 kPa at 50% strain.

12. The thermal barrier composite of claim 11, wherein the multilayer composite comprises a flame resistance rating of not greater than about 150° C.

13. The thermal barrier composite of claim 11, wherein the composite comprises a 50% strain compression rating of not greater than about 400 kPa.

14. The thermal barrier composite of claim 11, wherein the multilayer composite comprises a density of not greater than about 560 kg/m³.

15. The thermal barrier composite of claim 14, wherein the multilayer composite comprises a density of at least about 140 kg/m³.

16. The thermal barrier composite of claim 11, wherein the first porous layer comprises a silicon material content of at least about 30 wt. % and not greater than about 99 wt. % for a total weight of the first porous layer.

17. The thermal barrier composite of claim 11, wherein the first porous layer comprises a filler material.

18. The thermal barrier composite of claim 11, wherein the composite comprises a thickness ratio PL1/BL1 of at least about 2.0, where PL1 is equal to the thickness of the first porous layer and BL1 is equal to the thickness of the first barrier layer.

* * * * *